US012553946B2

(12) United States Patent
Gupta et al.

(10) Patent No.: US 12,553,946 B2
(45) Date of Patent: Feb. 17, 2026

(54) SYSTEM AND METHOD FOR GENERATING CLOCK PULSES FOR AT-SPEED TESTING OF INTEGRATED CIRCUITS

(71) Applicant: NXP B.V., Eindhoven (NL)

(72) Inventors: Chandan Gupta, Greater Noida (IN); Denish Thummar, Surat (IN); Saumya Pandey, Raseda (IN)

(73) Assignee: NXP B.V., Eindhoven (NL)

( * ) Notice: Subject to any disclaimer, the term of this patent is extended or adjusted under 35 U.S.C. 154(b) by 77 days.

(21) Appl. No.: 18/522,725

(22) Filed: Nov. 29, 2023

(65) Prior Publication Data

US 2025/0116703 A1 Apr. 10, 2025

(30) Foreign Application Priority Data

Oct. 4, 2023 (IN) .............................. 202341066371

(51) Int. Cl.
  *G01R 31/3185* (2006.01)
  *G01R 31/317* (2006.01)
  *H03K 3/037* (2006.01)

(52) U.S. Cl.
  CPC ................ *G01R 31/318552* (2013.01); *G01R 31/31727* (2013.01); *H03K 3/037* (2013.01)

(58) Field of Classification Search
  CPC ...... G01R 31/318552; G01R 31/31727; G01R 31/318594; G01R 31/31922; H03K 3/037; G06F 1/08
  USPC ........................................................ 714/731
  See application file for complete search history.

(56) References Cited

U.S. PATENT DOCUMENTS

| 6,442,722 B1 * | 8/2002 | Nadeau-Dostie ............................ G01R 31/31858 714/731 |
| 7,305,598 B1 * | 12/2007 | Sanghani ......... G01R 31/31727 714/724 |
| 7,380,189 B2 * | 5/2008 | Konuk ........... G01R 31/318555 714/731 |
| 7,403,058 B2 | 7/2008 | Yeh et al. |

(Continued)

FOREIGN PATENT DOCUMENTS

JP  2011158440 A  7/2014

OTHER PUBLICATIONS

Gupta et al., U.S. Appl. No. 18/305,464, filed Apr. 24, 2023, System and Method for Controlling At-Speed Testing of Integrated Circuits.
(Continued)

*Primary Examiner* — James C Kerveros

(57) ABSTRACT

An integrated circuit (IC), including a recording circuit and a clocking system, is provided. During a capture phase of an at-speed testing of the IC, the recording circuit records a number of clock pulses of a test clock signal and generates configuration data indicative of the recorded number of the clock pulses. The clocking system receives a reference clock signal and the configuration data and generates an at-speed clock signal. During the capture phase, the at-speed clock signal includes clock pulses that are extracted from the reference clock signal based on the configuration data. A count of the extracted clock pulses is equal to the recorded number of clock pulses of the test clock signal. The at-speed testing of the IC is enabled based on the at-speed clock signal.

19 Claims, 7 Drawing Sheets

(56) References Cited

U.S. PATENT DOCUMENTS

| | | | |
|---|---|---|---|
| 7,761,755 B1* | 7/2010 | Payakapan | G01R 31/31922 |
| | | | 714/724 |
| 7,844,875 B2* | 11/2010 | Jun | G06F 11/24 |
| | | | 714/744 |
| 2006/0242474 A1 | 10/2006 | Jun et al. | |
| 2008/0010573 A1 | 1/2008 | Sul | |
| 2010/0138709 A1* | 6/2010 | Wang | G01R 31/318552 |
| | | | 714/E11.169 |
| 2012/0323523 A1 | 12/2012 | Yoshikawa | |
| 2014/0359386 A1* | 12/2014 | Gorti | G01R 31/318552 |
| | | | 714/727 |

OTHER PUBLICATIONS

Gupta et al., U.S. Appl. No. 18/499,743, filed Nov. 1, 2023, Apparatuses and Methods for Faciliatating a Dynamic Clock Frequency for At-Speed Testing.

* cited by examiner

SYSTEM AND METHOD FOR GENERATING CLOCK PULSES FOR AT-SPEED TESTING OF INTEGRATED CIRCUITS

CROSS-REFERENCE TO RELATED APPLICATIONS

This application claims the priority under 35 U.S.C. § 119 of India Patent Application No. 202341066371, filed on 4 Oct. 2023, the contents of which are incorporated by reference herein.

FIELD OF USE

The present disclosure relates generally to electronic circuits, and, more particularly, to a system and a method for generating clock pulses for at-speed testing of integrated circuits.

BACKGROUND

Scan chains are widely used in integrated circuits (ICs) to facilitate structural testing (e.g., at-speed testing) of the ICs. The at-speed testing includes a shift phase and a capture phase. During the shift phase, a test pattern is shifted through a scan chain, and during the capture phase, a response of an IC to the shifted pattern is captured in the scan chain. The IC is tested for structural faults based on the captured response. To capture the response, data launch and data capture operations are executed. In the data launch operation, data bits of the test pattern are launched in functional components of the IC, and in the data capture operation, outputs of such functional components are stored in the scan chain.

BRIEF DESCRIPTION OF DRAWINGS

The following detailed description of the embodiments of the present disclosure will be better understood when read in conjunction with the appended drawings. The present disclosure is illustrated by way of example, and not limited by the accompanying figures, in which like references indicate similar elements.

DETAILED DESCRIPTION

Figure 1:
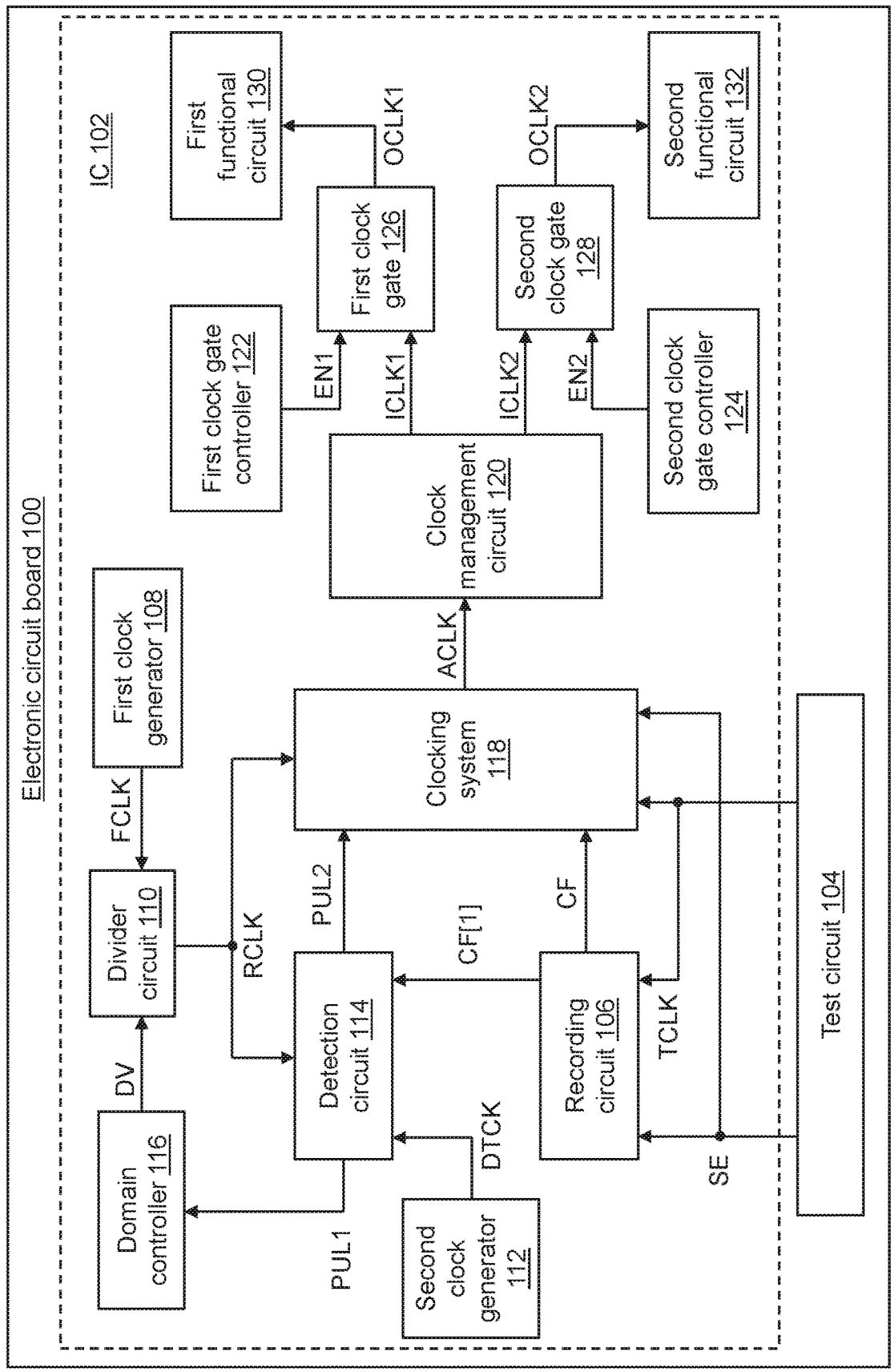
FIG. 1 illustrates a schematic block diagram of an electronic circuit board in accordance with an embodiment of the present disclosure.

The detailed description of the appended drawings is intended as a description of the embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Overview:

During the at-speed testing of an integrated circuit (IC), it is paramount that data launch and data capture operations are executed in synchronization with an operating frequency of the IC for accurate testing of the IC, as any deviation leads to inaccurate test results, thereby compromising the safety of the IC. Conventionally, during a capture phase of the at-speed testing of the IC, launch and capture pulses are generated to enable data launch and data capture operations, respectively. The launch and capture pulses are generated at an operating frequency of the IC (e.g., a frequency of a clock domain that is to be tested) to ensure correct identification of the transition faults. Typically, such clock pulses are not obtained from a test circuit that generates test patterns, and are generated using a clocking system of the IC. The clocking system includes shift registers, a memory to store various configuration values, and a test controller that determines the desired frequency, identifies configuration values associated with the desired frequency, and loads the identified configuration values in the shift registers. Each configuration value has exclusively one bit asserted and the positions of the asserted bits in the identified configuration values are controlled based on the desired frequency. The shift registers operate in synchronization with a phase-locked loop (PLL) clock signal and bits shifted-out by the shift registers during each clock cycle are utilized to extract the required pulses from the PLL clock signal. Thus, the clock pulses are generated at the operating frequency of the IC. Such clock pulses are then utilized to execute the data launch and data capture operations in the IC.

As the test circuit (e.g., an Automatic Test Pattern Generation (ATPG) tool) does not control the clock pulses generated during the capture phase, the test circuit is required to generate test patterns in-line with a fixed number of clock pulses that can be generated in the IC. However, the number of clock pulses required during the capture phase may vary. As a result, the utilization of a fixed number of clock pulses during the capture phase limits the fault coverage and the test quality of the at-speed testing of the IC. Further, utilizing multi-load patterns or random-access-memory (RAM) sequential patterns for testing the IC is not possible, as these patterns include multiple capture phases and require a variable number of clock pulses during each capture phase. Additionally, including a memory for storing configuration values for each possible operating frequency increases the size of the clocking system, and in turn, the IC.

Various embodiments of the present disclosure disclose an electronic circuit board that includes an IC and a test circuit that may generate a test pattern and a test clock signal to facilitate the at-speed testing of the IC. During a shift phase of the at-speed testing, the test clock signal may include multiple clock pulses required to shift the test pattern in scan chains of the IC. Further, during a capture phase of the at-speed testing, the test clock signal includes a number of clock pulses required for testing the IC using the generated test pattern. Thus, the test clock signal may have more than two clock pulses if that is the requirement for the at-speed testing of the IC using the generated test pattern.

The IC may include a recording circuit, a detection circuit, and a clocking system. The clocking system may include a shift register, a register control circuit, and a gating circuit. The recording circuit may receive the test clock signal, record a number of clock pulses of the test clock signal during the capture phase, generate configuration data that is indicative of the recorded number of clock pulses, and provide the configuration data to the register control circuit. The configuration data includes multiple data bits, with a number of asserted data bits being indicative of the recorded number of clock pulses. The detection circuit may receive a predefined data bit of the configuration data, and determine, based on the logic state of the predefined data bit, whether the test clock signal includes a threshold number of clock pulses during the capture phase. The predefined data bit corresponds to a least significant bit or a data bit that is adjacent to the least significant bit. Based on the determination that the test clock signal includes the threshold number of clock pulses during the capture phase, the detection circuit may enable alteration of a frequency of a reference clock signal of the IC to be equal to a frequency of a clock domain that is to be tested, and enable loading of the configuration data in the shift register of the clocking system. The data bits of the configuration data are shifted in the shift register based on the reference clock signal such that for each cycle of the reference clock signal, the shift register outputs a data bit of the configuration data as a gating data bit. The gating circuit extracts two or more clock pulses from the reference clock signal based on the gating data bit. A count of extracted clock pulses is equal to the recorded number of clock pulses of the test clock signal. An at-speed clock signal including the extracted clock pulses is utilized to enable the at-speed testing of the IC. The clock pulses of the at-speed clock signal may thus include a launch pulse and one or more capture pulses.

Thus, during the capture phase, the recording circuit records the clock pulses generated by the test circuit and the clocking system replays the recorded clock pulses at the desired operating frequency for enabling the at-speed testing of the IC. The capture phase operations are thus controlled by the test circuit. As a result, the test circuit can generate test patterns requiring any number of clock pulses and generate the desired number of clock pulses during the capture phase which will be recorded by the recorded circuit and replayed at the desired operating frequency by the clocking system. In other words, the generation of the test patterns is not restricted by a fixed number of clock pulses during the capture phase. In contrast, at-speed testing of a conventional IC (e.g., an IC where the conventional technique of generating launch and capture pulses is implemented) requires a fixed number of clock pulses during the capture phase and the test circuit is required to generate test patterns in accordance with the required number of clock pulses. Consequently, the fault coverage and the test quality of the at-speed testing of the IC of the present disclosure are significantly greater than that of the conventional IC. Further, as the test circuit controls the clock generation during the capture phase, multi-load patterns or RAM sequential patterns can be utilized for the at-speed testing, thereby further improving the test quality.

Additionally, in the present disclosure, dynamically generated configuration data is loaded in a shift register, and the output bit of the shift register is utilized for extracting clock pulses from the reference clock signal. This is contrary to the conventional IC, where a memory stores predefined configuration values for each possible operating frequency, and configuration values for loading in the shift registers are identified from the predefined configuration values stored in the memory. As a result, the size of the clocking system of the present disclosure is significantly less than that of a clocking system of the conventional IC. Consequently, the size of the IC of the present disclosure is significantly less than that of the conventional IC.

FIG. 1 illustrates a schematic block diagram of an electronic circuit board 100 in accordance with an embodiment of the present disclosure. In an embodiment, the electronic circuit board 100 corresponds to a printed circuit board (PCB). The electronic circuit board 100 may be implemented in various automotive devices, network devices, mobile devices, or the like. The electronic circuit board 100 may include an integrated circuit (IC) 102 and a test circuit 104.

The IC 102 may typically operate in a functional mode (e.g., various functional operations may be performed in the IC 102). To ensure that the IC 102 is operating in a desired manner, the IC 102 may be structurally tested to detect faults in various functional components of the IC 102. At-speed testing is one type of structural testing that is implemented in the IC 102 to detect the faults therein. The at-speed testing includes a shift phase and a capture phase. During the shift phase, a test pattern (not shown) may be shifted through the IC 102 (e.g., scan chains of the IC 102), and a response of the IC 102 to the test pattern may be captured during the capture phase. The IC 102 is tested for structural faults based on the captured response.

The test circuit 104 is included in the electronic circuit board 100 to enable the at-speed testing of the IC 102. The test circuit 104 may include suitable circuitry that may be configured to perform one or more operations. For example, the test circuit 104 may be configured to generate the test pattern utilized for the at-speed testing of the IC 102. Examples of the test pattern may include a single load pattern, a multi-load pattern, a random-access-memory (RAM) sequential pattern, or the like. The single load pattern may include a single data launch operation and a single data capture operation, whereas, the multi-load and RAM sequential patterns may include multiple data launch and data capture operations.

The test circuit 104 may be further configured to generate a scan enable signal SE that is indicative of a current operational mode of the IC 102. For example, the scan enable signal SE is de-asserted (e.g., is at a logic low state) during the capture phase, and the scan enable signal SE is asserted (e.g., is at a logic high state) during the shift phase. The test circuit 104 may be further configured to generate a test clock signal TCLK that is utilized for the at-speed testing of the IC 102. The test pattern and/or the test clock signal TCLK may be generated based on the functional components and clock domains that are to be tested. In an embodiment, the test circuit 104 corresponds to an Automatic Test Pattern Generation (ATPG) tool. Although not shown, the test circuit 104 may include various components for facilitating various operations thereof. For example, the test circuit 104 may include a pattern generator to generate the test pattern, a test clock generator to generate the test clock signal TCLK, and a test controller to generate the scan enable signal SE based on the operational mode of the IC 102.

During the shift phase, the IC 102 (e.g., the scan chains of the IC 102) may be synchronized based on the test clock signal TCLK. In other words, the test pattern is shifted through the scan chains of the IC 102 in synchronization with the test clock signal TCLK. During the capture phase, multiple clock pulses (e.g., launch and capture pulses) of a desired operating frequency are required to capture the response accurately. Conventionally, the clock pulses required during the capture phase are generated inside an IC, and the number of clock pulses is fixed (e.g., two clock pulses; one launch pulse and one capture pulse). A conventional test circuit thus has no control over the generation of the clock pulses of the capture phase, and instead, generates the test pattern in-line with the fixed number of clock pulses that can be generated in the conventional IC. In other words, the test pattern generation is constrained by the number of clock pulses that can be generated inside the conventional IC. In the present disclosure, the number of clock pulses generated during the capture phase is controlled by the test circuit 104, and hence, the test pattern generated by the test circuit 104 is not restricted by a fixed clock pulse number.

The test clock signal TCLK may thus include two or more clock pulses during the capture phase. In an embodiment, the test circuit 104 may determine the number of clock pulses of the test clock signal TCLK during the capture phase based on a sequential depth of the test pattern. Typically, the sequential depth of the test pattern is one and requires two clock pulses during the capture phase (e.g., one launch pulse and one capture pulse). However, for specific test patterns, such as multi-load patterns, RAM sequential patterns, or the like, the sequential depth may be in the range of two to five, and hence, may require more than two clock pulses during the capture phase (e.g., one launch pulse and two or more capture pulses).

The number of clock pulses of the test clock signal TCLK during the capture phase is then recorded and replayed at the desired operating frequency inside the IC 102 to enable the at-speed testing of the IC 102 in an accurate manner. The IC 102 may include a recording circuit 106, a first clock generator 108, a divider circuit 110, a second clock generator 112, a detection circuit 114, a domain controller 116, and a clocking system 118 to execute the recording and replaying operations.

The recording circuit 106 may be coupled to the test circuit 104. The recording circuit 106 may be configured to receive the test clock signal TCLK and the scan enable signal SE from the test circuit 104. The scan enable signal SE may control an operation of the recording circuit 106. For example, the recording circuit 106 may be in a reset state (e.g., may be non-operational) when the scan enable signal SE is asserted (e.g., during the shift phase). Conversely, the recording circuit 106 may be operational when the scan enable signal SE is de-asserted (e.g., during the capture phase). During the capture phase, the recording circuit 106 may be further configured to record the number of clock pulses of the test clock signal TCLK.

The recording circuit 106 may be further configured to generate configuration data CF indicative of the recorded number of clock pulses of the test clock signal TCLK. The configuration data CF includes a plurality of data bits. A number of asserted data bits of the configuration data CF is indicative of the recorded number of clock pulses of the test clock signal TCLK during the capture phase. In an embodiment, the assertion of data bits is executed in a sequential manner from a least significant bit (LSB) to a most significant bit (MSB). For example, if the test clock signal TCLK includes three clock pulses, three data bits of the configuration data CF are asserted. The asserted three data bits may correspond to the LSB, a data bit that is adjacent to the LSB (hereinafter referred to as "LSB-1"), and a data bit that is adjacent to the LSB-1 (hereinafter referred to as "LSB-2"). Further, as the recording circuit 106 is in the reset state during the shift phase, the configuration data CF may have all zeros (e.g., each data bit of the plurality of data bits is de-asserted) during the shift phase. The recording circuit 106 is explained in detail in conjunction with FIG. 2.

The recording circuit 106 thus enables the recording operation. The replaying of the recorded clock pulses at the desired operating frequency is enabled by the first and second clock generators 108 and 112, the divider circuit 110, the detection circuit 114, the domain controller 116, and the clocking system 118.

The first and second clock generators 108 and 112 may include suitable circuitry that may be configured to perform one or more operations. For example, the first clock generator 108 may be configured to generate a fixed clock signal FCLK, whereas, the second clock generator 112 may be configured to generate a detection clock signal DTCK. Both the fixed and detection clock signals FCLK and DTCK may be free-running clock signals having fixed frequencies. The frequency of the fixed clock signal FCLK is greater than a frequency of the test clock signal TCLK, whereas, a difference between the frequencies of the detection and test clock signals DTCK and TCLK is within a predefined range. In an embodiment, the predefined range may correspond to a range of ±5% of the frequency of the test clock signal TCLK. However, in other embodiments, the predefined range may have other values. The fixed clock signal FCLK may be utilized for the functional operations and the at-speed testing operations of the IC 102. The detection clock signal DTCK, on the other hand, may be utilized to enable the replaying operation.

The divider circuit 110 may be coupled to the first clock generator 108 and the domain controller 116. The divider circuit 110 may include suitable circuitry that may be configured to perform one or more operations. For example, the divider circuit 110 may be configured to receive the fixed clock signal FCLK from the first clock generator 108 and a divider value DV from the domain controller 116. The divider circuit 110 may be further configured to generate a reference clock signal RCLK based on the fixed clock signal FCLK and the divider value DV such that a frequency of the reference clock signal RCLK is equal to a division of the fixed frequency of the fixed clock signal FCLK by the divider value DV. The divider value DV may thus be generated based on the desired operating frequency (e.g., a frequency at which the IC 102 is to be tested). In an embodiment, the first clock generator 108 and the divider circuit 110 may constitute a phase-locked loop (PLL) with the reference clock signal RCLK corresponding to a PLL clock signal.

The detection circuit 114 may be coupled to the recording circuit 106, the divider circuit 110, the second clock generator 112, the domain controller 116, and the clocking system 118. The detection circuit 114 may be configured to receive the detection clock signal DTCK from the second clock generator 112, and a predefined data bit of the configuration data CF from the recording circuit 106. Based on the logic state of the predefined data bit and in synchronization with the detection clock signal DTCK, the detection circuit 114 may be configured to determine whether the test clock signal TCLK includes a threshold number of clock pulses during the capture phase. In an embodiment, the detection circuit 114 determines that the test clock signal TCLK includes the threshold number of clock pulses during the capture phase based on the asserted state of the predefined data bit. Further, in an example, the threshold number of clock pulses corresponds to two. Hence, the predefined data bit corresponds to the LSB-1 of the configuration data CF, as LSB-1 is asserted when two clock pulses are received during the capture phase. The predefined data bit is hereinafter referred to as the "predefined data bit CF [1]". However, the scope of the present disclosure is not limited to the predefined data bit corresponding to the LSB-1 of the configuration data CF. In other embodiments, the threshold number of clock pulses may correspond to one, and in such cases, the detection circuit 114 may receive the LSB of the configuration data CF instead of LSB-1.

On a lapse of a first predetermined time duration after determining that the test clock signal TCLK includes the threshold number of clock pulses during the capture phase, the detection circuit 114 may be further configured to generate a first pulse signal PUL1. In other words, the detection circuit 114 may generate the first pulse signal PUL1, the first predetermined time duration after the receipt of the asserted predefined data bit CF [1].

The first pulse signal PUL1 is utilized to adjust the frequency of the reference clock signal RCLK. For example, the detection circuit 114 may be further configured to provide the first pulse signal PUL1 to the domain controller 116. The domain controller 116 may include suitable circuitry that may be configured to perform one or more operations. For example, the domain controller 116 may be configured to identify a first clock domain, of the IC 102, that is to be tested (e.g., a frequency at which the IC 102 is to be tested) during the capture phase. In an embodiment, the domain controller 116 may identify that the first clock domain is to be tested at the end of the shift phase based on one or more indicators received from the test circuit 104. Further, during the capture phase, the domain controller 116 may be configured to receive the first pulse signal PUL1 from the detection circuit 114 and generate, based on a frequency of the first clock domain and the first pulse signal PUL1 (e.g., based on the receipt of the first pulse signal PUL1), the divider value DV to control the frequency of the reference clock signal RCLK. Based on the divider value DV, the frequency of the reference clock signal RCLK is adjusted to be equal to the frequency of the first clock domain (e.g., the frequency at which the IC 102 is to be tested).

The detection circuit 114 may be further configured to detect whether all clock pulses of the test clock signal TCLK during the capture phase are recorded by the recording circuit 106 and/or the change in the frequency of the reference clock signal RCLK is settled. The detection may be executed based on the determination that the test clock signal TCLK includes the threshold number of clock pulses during the capture phase. The detection circuit 114 may be further configured to generate a second pulse signal PUL2 indicating that all clock pulses of the test clock signal TCLK are recorded and that the change in the frequency of the reference clock signal RCLK is settled. To ensure that all clock pulses of the test clock signal TCLK are recorded by the recording circuit 106 and that the change in the frequency of the reference clock signal RCLK is settled, the detection circuit 114 generates the second pulse signal PUL2, a second predetermined time duration after the receipt of the asserted predefined data bit CF [1]. The second predetermined time duration is greater than the first predetermined time duration. In an example, the second predetermined time duration is greater than the total time duration for a maximum number of clock pulses that can be generated by the test circuit 104 during the capture phase. The detection circuit 114 may be further configured to provide the second pulse signal PUL2 to the clocking system 118. The detection circuit 114 is explained in detail in conjunction with FIG. 2.

The clocking system 118 may be coupled to the divider circuit 110, the detection circuit 114, the recording circuit 106, and the test circuit 104. The clocking system 118 may be configured to receive the reference clock signal RCLK, the second pulse signal PUL2, and the configuration data CF from the divider circuit 110, the detection circuit 114, and the recording circuit 106, respectively. Further, the clocking system 118 may be configured to receive the scan enable signal SE and the test clock signal TCLK from the test circuit 104. The clocking system 118 may be further configured to generate an at-speed clock signal ACLK based on the reference clock signal RCLK, the second pulse signal PUL2, the configuration data CF, the scan enable signal SE, and the test clock signal TCLK.

During the shift phase, the at-speed clock signal ACLK is same as the test clock signal TCLK. Further, during the capture phase, the at-speed clock signal ACLK includes a plurality of clock pulses that are extracted from the reference clock signal RCLK based on the configuration data CF and the second pulse signal PUL2. A count of the plurality of clock pulses is equal to the recorded number of clock pulses of the test clock signal TCLK during the capture phase (e.g., a number of asserted data bits of the configuration data CF). Thus, the at-speed clock signal ACLK has the same number of clock pulses as the test clock signal TCLK during the capture phase. In an embodiment, the plurality of clock pulses includes a launch pulse and one or more capture pulses. Further, since these clock pulses are extracted from the reference clock signal RCLK which is adjusted to the desired operating frequency, the frequency of the at-speed clock signal ACLK is equal to the frequency of the first clock domain that is to be tested (e.g., the frequency at which the IC 102 is to be tested). The at-speed testing of the IC 102 may thus be enabled based on the at-speed clock signal ACLK. The clocking system 118 is explained in detail in conjunction with FIG. 3.

The IC 102 may further include a clock management circuit 120 that may be coupled to the clocking system 118. The clock management circuit 120 may include suitable circuitry that may be configured to perform one or more operations. For example, the clock management circuit 120 may be configured to receive the at-speed clock signal ACLK from the clocking system 118 and generate first and second intermediate clock signals ICLK1 and ICLK2. During the shift and capture phases, each of the first and second intermediate clock signals ICLK1 and ICLK2 may be same as the at-speed clock signal ACLK. The clock management circuit 120 may include a plurality of dividers (not shown) for dividing the received clock signal (e.g., the at-speed clock signal ACLK). However, the plurality of dividers is bypassed (e.g., is deactivated) during the at-speed testing of the IC 102. Thus, in an embodiment, during the at-speed testing, flip-flops (not shown) of the plurality of dividers may be included in scan chains of the IC 102 to further improve the at-speed testing of the IC 102.

The IC 102 may further include a plurality of clock gate controllers, of which first and second clock gate controllers 122 and 124 are shown, and a plurality of clock gates, of which first and second clock gates 126 and 128 are shown. The plurality of clock gates may be coupled to the plurality of clock gate controllers such that the first and second clock gates 126 and 128 may be coupled to the first and second clock gate controllers 122 and 124, respectively. The IC 102 may further include a plurality of functional circuits, of which first and second functional circuits 130 and 132 are shown. The plurality of functional circuits may be coupled to the plurality of clock gates such that the first and second functional circuits 130 and 132 may be coupled to the first and second clock gates 126 and 128, respectively. The plurality of functional circuits may be associated with a plurality of clock domains of the IC 102. In other words, each functional circuit may operate at a different clock frequency. Although not shown, each functional circuit may include one or more scan chains and other functional components of the IC 102.

The first and second clock gate controllers 122 and 124 may include suitable circuitry that may be configured to perform one or more operations. For example, the first and second clock gate controllers 122 and 124 may be configured to generate first and second enable signals EN1 and EN2 for controlling the operations of the first and second clock gates 126 and 128, respectively. The first and second enable signals EN1 and EN2 are generated such that, during the capture phase of the at-speed testing of the IC 102, one of the first and second enable signals EN1 and EN2 is asserted. The first and second clock gate controllers 122 and 124 may be further associated with the first clock domain and a second clock domain of the IC 102, respectively. Thus, the first enable signal EN1 is asserted for enabling the testing of the first clock domain. Similarly, the second enable signal EN2 is asserted for enabling the testing of the second clock domain.

The first and second clock gates 126 and 128 may include suitable circuitry that may be configured to perform one or more operations. For example, the first and second clock gates 126 and 128 may be configured to receive the first and second intermediate clock signals ICLK1 and ICLK2 from the clock management circuit 120, respectively. During the capture phase, the first and second intermediate clock signals ICLK1 and ICLK2 are the same as the at-speed clock signal ACLK. Thus, each of the first and second clock gates 126 and 128 may receive the at-speed clock signal ACLK during the capture phase. The first and second clock gates 126 and 128 may be further configured to receive the first and second enable signals EN1 and EN2 from the first and second clock gate controllers 122 and 124, respectively. Further, the first and second clock gates 126 and 128 may be configured to generate and provide first and second output clock signals OCLK1 and OCLK2 to the first and second functional circuits 130 and 132 to enable the at-speed testing of the first and second functional circuits 130 and 132, respectively.

The first output clock signal OCLK1 is generated based on the first intermediate clock signal ICLK1 and the first enable signal EN1. For example, the first output clock signal OCLK1 may be de-asserted based on the de-assertion of the first enable signal EN1. Further, based on the assertion of the first enable signal EN1, the first output clock signal OCLK1 may be same as the first intermediate clock signal ICLK1. In other words, the first clock gate 126 is activated based on the assertion of the first enable signal EN1. Thus, when the first clock domain is to be tested, the first enable signal EN1 is asserted during the capture phase. Consequently, the first clock gate 126 is activated and may provide the launch and capture pulses (e.g., the first output clock signal OCLK1) to the first functional circuit 130 to enable the at-speed testing of the first functional circuit 130. When the first clock domain is not tested, the first enable signal EN1 remains de-asserted, and in turn, the first output clock signal OCLK1 remains de-asserted. Thus, during the capture phase, the first output clock signal OCLK1 may be de-asserted or may include the launch and capture pulses from the at-speed clock signal ACLK.

The second output clock signal OCLK2 may be similarly generated based on the second intermediate clock signal ICLK2 and the second enable signal EN2. Thus, during the capture phase, the second output clock signal OCLK2 may be de-asserted or may include the launch and capture pulses from the at-speed clock signal ACLK.

The first and second functional circuits 130 and 132 may be configured to receive the first and second output clock signals OCLK1 and OCLK2 from the first and second clock gates 126 and 128, respectively. During the capture phase, if the first clock gate 126 is activated, the first clock gate 126 may provide the plurality of clock pulses (e.g., the launch and capture pulses) to the first functional circuit 130, and the first functional circuit 130 may be further configured to execute one or more operations (e.g., data launch and data capture operations) of the capture phase based on the plurality of clock pulses. Thus, based on the launch pulse of the first output clock signal OCLK1, the data bits of the test pattern may be launched in the first functional circuit 130 (e.g., in various functional components of the first functional circuit 130). Further, based on the one or more capture pulses of the first output clock signal OCLK1, the response of the first functional circuit 130 to the test pattern is captured in the first functional circuit 130 (e.g., in the scan chains of the first functional circuit 130). The first functional circuit 130 may be tested based on the captured response. Similarly, if the second clock gate 128 is activated during the capture phase, the second clock gate 128 may provide the plurality of clock pulses (e.g., the launch and capture pulses) to the second functional circuit 132, and the second functional circuit 132 may be further configured to execute the one or more operations (e.g., the data launch and data capture operations) of the capture phase based on the plurality of clock pulses.

During the shift phase, the first and second enable signals EN1 and EN2 may remain asserted, and the test clock signal TCLK may be provided to the first and second functional circuits 130 and 132, respectively. The IC 102 may include various shift phase control circuits (not shown) that facilitate the operation during the shift phase. Further, during the functional mode, the clocking system 118 may pass the reference clock signal RCLK without modification and the plurality of dividers of the clock management circuit 120 may be activated to generate multiple clock signals of different frequencies. Further, similar to the shift phase, the first and second enable signals EN1 and EN2 may remain asserted during the functional mode to facilitate the provision of the clock signals to the corresponding functional circuits.

A single functional circuit is illustrated for one clock domain to keep the description concise and clear, and should not be considered a limitation of the present disclosure. In other embodiments, one clock domain may encompass multiple functional circuits, without deviating from the scope of the present disclosure.

Although FIG. 1 illustrates two clock gates, two clock gate controllers, and two functional circuits, the scope of the present disclosure is not limited to it. In various other embodiments, the IC 102 may include more than two clock gates, more than two clock gate controllers, and more than two functional circuits, without deviating from the scope of the present disclosure.

Although FIG. 1 illustrates that the IC 102 includes the second clock generator 112, the scope of the present disclosure is not limited to it. In an alternate embodiment, the second clock generator 112 may be external to the IC 102, without deviating from the scope of the present disclosure.

Figure 2:
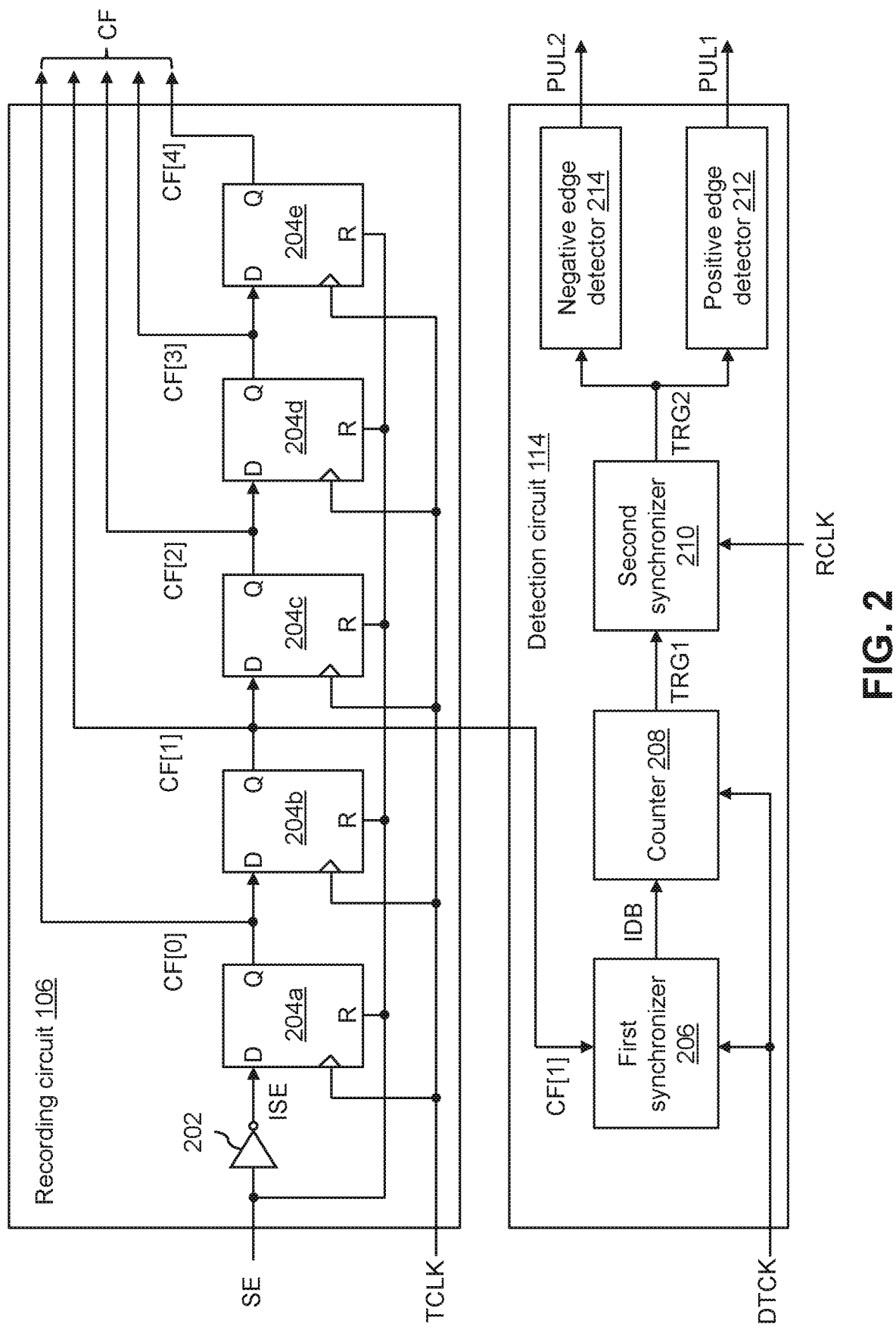
FIG. 2 illustrates schematic block diagrams of a recording circuit and a detection circuit of an integrated circuit (IC) of the electronic circuit board of FIG. 1 in accordance with an embodiment of the present disclosure.

FIG. 2 illustrates schematic block diagrams of the recording circuit 106 and the detection circuit 114 in accordance with an embodiment of the present disclosure. The recording circuit 106 records the number of clock pulses of the test clock signal TCLK, whereas, the detection circuit 114 enables the frequency control of the reference clock signal RCLK and the generation of the at-speed clock signal ACLK from the reference clock signal RCLK. To execute the aforementioned operations, the recording circuit 106 may include an inverter 202 and first through fifth flip-flops 204a-204e (collectively referred to as a "plurality of flip-flops 204a-204e"), and the detection circuit 114 may include a first synchronizer 206, a counter 208, a second synchronizer 210, a positive edge detector 212, and a negative edge detector 214.

Recording Circuit 106:

The inverter 202 may be coupled to the test circuit 104 and the first flip-flop 204a. The inverter 202 may be configured to receive the scan enable signal SE from the test circuit 104, generate an inverted scan enable signal ISE that is an inverted version of the scan enable signal SE, and provide the inverted scan enable signal ISE to the first flip-flop 204a.

The plurality of flip-flops 204a-204e may be coupled in series, and may be configured to generate the configuration data CF. For example, the first through fifth flip-flops 204a-204e may be configured to generate first through fifth data bits CF [0]—CF [4] of the configuration data CF, respectively. In an embodiment, each of the plurality of flip-flops 204a-204e is a D flip-flop. Each flip-flop of the plurality of flip-flops 204a-204e may include an input terminal, a reset terminal, a clock terminal, and an output terminal.

The reset terminal of each flip-flop of the plurality of flip-flops 204a-204e may be coupled to the test circuit 104, and may be configured to receive the scan enable signal SE from the test circuit 104. The scan enable signal SE controls the operation of each flip-flop. For example, based on the scan enable signal SE, each flip-flop is in a reset state during the shift phase and generates the corresponding data bit of the configuration data CF during the capture phase.

The input terminal of the first flip-flop 204a may be coupled to the inverter 202, and may be configured to receive the inverted scan enable signal ISE from the inverter 202. Further, as the plurality of flip-flops 204a-204e are coupled series, the input terminal of the second flip-flop 204b may be coupled to the output terminal of the first flip-flop 204a, and the input terminal of the third flip-flop 204c may be coupled to the output terminal of the second flip-flop 204b. Similarly, the input terminal of the fourth flip-flop 204d may be coupled to the output terminal of the third flip-flop 204c, and the input terminal of the fifth flip-flop 204e may be coupled to the output terminal of the fourth flip-flop 204d. In other words, the input terminal of each remaining flip-flop (e.g., each of the second through fifth flip-flops 204b-204e) may be coupled to an output terminal of a previous flip-flop.

The clock terminal of the first flip-flop 204a may be coupled to the test circuit 104, and may be configured to receive the test clock signal TCLK from the test circuit 104. Further, the output terminal of the first flip-flop 204a may be configured to generate a first data bit CF [0] (e.g., the LSB) of the configuration data CF. The first data bit CF [0] is logically equivalent to the inverted scan enable signal ISE and is generated in synchronization with the test clock signal TCLK. Similarly, the clock terminal of each of the second through fifth flip-flops 204b-204e may be coupled to the test circuit 104, and may be configured to receive the test clock signal TCLK from the test circuit 104. Further, the output terminal of each of the second through fifth flip-flops 204b-204e may be configured to generate a corresponding data bit of the configuration data CF. Thus, the second through fifth flip-flops 204b-204e may generate second through fifth data bits CF [1]—CF [4] of the configuration data CF, respectively.

Thus, during the shift phase, the scan enable signal SE is asserted and the first through fifth flip-flops 204a-204e are in the reset state (e.g., may be non-operational). Consequently, the first through fifth data bits CF [0]—CF [4] may be de-asserted. During the capture phase, the scan enable signal SE transitions from the asserted state to the de-asserted state (e.g., the inverted scan enable signal ISE transitions from the de-asserted state to the asserted state) and the first through fifth flip-flops 204a-204e are operational. In such a scenario, when a first clock pulse of the test clock signal TCLK is received, the first data bit CF [0] is asserted based on the asserted state of the inverted scan enable signal ISE. Further, when a second clock pulse of the test clock signal TCLK is received, the second data bit CF [1] is asserted based on the asserted state of the first data bit CF [0]. Similarly, for every subsequent clock pulse that is received, the corresponding data bits (e.g., the third through fifth data bits CF [2]—CF [4]) may be asserted in a sequential manner. For example, during the capture phase, if three clock pulses are received, the first through third data bits CF [0]—CF [2] are asserted and the fourth and fifth data bits CF [3] and CF [4] are de-asserted. Further, if four clock pulses are received, the first through fourth data bits CF [0]—CF [3] are asserted and the fifth data bit CF [4] is de-asserted. Thus, a number of asserted data bits in the configuration data CF is indicative of a number of clock pulses of the test clock signal TCLK received (e.g., recorded) during the capture phase.

Detection Circuit 114:

The first synchronizer 206 may be coupled to the recording circuit 106 (e.g., the output terminal of the second flip-flop 204b) and the second clock generator 112. The first synchronizer 206 may include suitable circuitry that may be configured to perform one or more operations. For example, the first synchronizer 206 may be configured to receive the predefined data bit CF [1] (e.g., the second data bit CF [1]) and the detection clock signal DTCK from the recording circuit 106 and the second clock generator 112, respectively. Further, the first synchronizer 206 may be configured to generate, in synchronization with the detection clock signal DTCK, an intermediate data bit IDB that is logically equivalent to the second data bit CF [1]. Thus, the first synchronizer 206 synchronizes the second data bit CF [1] with respect to the detection clock signal DTCK. Therefore, when the second pulse of the test clock signal TCLK is received, the second data bit CF [1] is asserted, and as a result, the intermediate data bit IDB is asserted in synchronization with the detection clock signal DTCK. In an embodiment, the first synchronizer 206 may include one or more positive edge-triggered D flip-flops. However, the first synchronizer 206 may include different components in other embodiments.

The counter 208 may be coupled to the first synchronizer 206 and the second clock generator 112. The counter 208 may include suitable circuitry that may be configured to perform one or more operations. For example, the counter 208 may be configured to receive the intermediate data bit IDB from the first synchronizer 206. In other words, the first synchronizer 206 may be further configured to provide the intermediate data bit IDB to the counter 208. The operation of the counter 208 may be controlled based on the logic state of the intermediate data bit IDB. For example, the counter 208 is activated based on the asserted state of the intermediate data bit IDB, and the counter 208 is deactivated (e.g., reset) based on the de-asserted state of the intermediate data bit IDB. The counter 208 may be further configured to receive the detection clock signal DTCK from the second clock generator 112. When activated, the counter 208 may be configured to generate a count value (not shown) such that the count value is incremented in synchronization with the detection clock signal DTCK. Thus, the counter 208 is activated and generates the count value based on the asserted state of the predefined data bit CF [1] of the configuration data CF.

The counter 208 may be further configured to generate a first trigger signal TRG1 based on the count value. When the counter 208 is activated, the counter 208 starts counting from the value '0' (e.g., the count value starts incrementing from the value '0'). In such a scenario, the first trigger signal TRG1 is de-asserted. Further, when the count value reaches a first predetermined value, the first trigger signal TRG1 may transition from the de-asserted state to the asserted state. Similarly, when the count value reaches a second predetermined value that is greater than the first predetermined value, the first trigger signal TRG1 may transition from the asserted state to the de-asserted state. In an embodiment, the counter 208 is a 4-bit counter. In such a scenario, the first trigger signal TRG1 transitions from the de-asserted state to the asserted state when the count value reaches the value '7' and transitions from the asserted state to the de-asserted state when the count value reaches the value '15'. Thus, the first and second predetermined values correspond to the value '7' and the value '15', respectively. The counter 208 may include more or less than four bits in other embodiments.

The second synchronizer 210 may be coupled to the counter 208 and the divider circuit 110. The second synchronizer 210 may include suitable circuitry that may be configured to perform one or more operations. For example, the second synchronizer 210 may be configured to receive the first trigger signal TRG1 and the reference clock signal RCLK from the counter 208 and the divider circuit 110, respectively. Further, the second synchronizer 210 may be configured to generate, in synchronization with the reference clock signal RCLK, a second trigger signal TRG2 that is logically equivalent to the first trigger signal TRG1. Thus, the second synchronizer 210 synchronizes the first trigger signal TRG1 with respect to the reference clock signal RCLK. In an embodiment, the second synchronizer 210 may include one or more positive edge-triggered D-flip-flops. However, the second synchronizer 210 may include different components in other embodiments.

The positive edge detector 212 may be coupled to the second synchronizer 210 and the domain controller 116. The positive edge detector 212 may include suitable circuitry that may be configured to perform one or more operations. For example, the positive edge detector 212 may be configured to receive the second trigger signal TRG2 from the second synchronizer 210 and generate the first pulse signal PUL1 based on the transition of the second trigger signal TRG2 from the de-asserted state to the asserted state (e.g., based on the detection of the positive edge of the second trigger signal TRG2). Further, the positive edge detector 212 may be configured to provide the first pulse signal PUL1 to the domain controller 116. As described in FIG. 1, based on the first pulse signal PUL1 (e.g., based on the receipt of the first pulse signal PUL1), the domain controller 116 may generate the divider value DV to control the frequency of the reference clock signal RCLK to be equal to the frequency of the first clock domain that is to be tested (e.g., the frequency at which the IC 102 is to be tested).

The negative edge detector 214 may be coupled to the second synchronizer 210 and the clocking system 118. The negative edge detector 214 may include suitable circuitry that may be configured to perform one or more operations. For example, the negative edge detector 214 may be configured to receive the second trigger signal TRG2 from the second synchronizer 210 and generate the second pulse signal PUL2 based on a transition of the second trigger signal TRG2 from the asserted state to the de-asserted state (e.g., based on the detection of the negative edge of the second trigger signal TRG2). Further, the negative edge detector 214 may be configured to provide the second pulse signal PUL2 to the clocking system 118 to enable the generation of the at-speed clock signal ACLK.

Thus, while the second data bit CF [1] is de-asserted, the intermediate data bit IDB is de-asserted, and the counter 208 is deactivated. At such an instance, the first trigger signal TRG1 is de-asserted. When the second data bit CF [1] is asserted (e.g., when two clock pulses of the test clock signal TCLK are received), the intermediate data bit IDB is asserted in synchronization with the detection clock signal DTCK, and the counter 208 is activated. The count value is thus incremented with each cycle of the detection clock signal DTCK, and simultaneously, other clock pulses of the test clock signal TCLK may be recorded by the recording circuit 106. While the count value is incremented, the first trigger signal TRG1 remains de-asserted. When the count value reaches the value '7', the first trigger signal TRG1 transitions from the de-asserted state to the asserted state. Further, during the next rising edge of the reference clock signal RCLK, the second trigger signal TRG2 transitions from the de-asserted state to the asserted state. The first pulse signal PUL1 is then asserted to enable the frequency control of the reference clock signal RCLK. The frequency of the reference clock signal RCLK is thus controlled based on the determination that the test clock signal TCLK includes the threshold number of clock pulses during the capture phase. The first predetermined time duration (e.g., the time duration between the receipt of the asserted second data bit CF [1] and the generation of the first pulse signal PUL1) thus corresponds to the time taken for the count value to reach the value '7' (e.g., the first predetermined value).

The count value may continue to increment with each cycle of the detection clock signal DTCK until the count value reaches the value '15'. When the count value reaches the value '15', the first trigger signal TRG1 transitions from the asserted state to the de-asserted state. Further, during the next rising edge of the reference clock signal RCLK, the second trigger signal TRG2 transitions from the asserted state to the de-asserted state. The second pulse signal PUL2 is then asserted to enable the generation of the at-speed clock signal ACLK. The generation of the at-speed clock signal ACLK is thus controlled based on the determination that the test clock signal TCLK includes the threshold number of clock pulses during the capture phase. The second predetermined time duration (e.g., the time duration between the receipt of the asserted second data bit CF [1] and the generation of the second pulse signal PUL2) thus corresponds to the time taken for the count value to reach the value '15' (e.g., the second predetermined value). The time duration between the generation of the first and second pulse signals PUL1 and PUL2 (e.g., between the value '7' to the value '15') ensures that the change in the frequency of the reference clock signal RCLK is settled before the extraction of clock pulses from the reference clock signal RCLK.

The scope of the present disclosure is not limited to the detection circuit 114 executing the corresponding operations based on the second data bit CF [1]. In other embodiments, the first data bit CF [0] may be utilized instead, without deviating from the scope of the present disclosure.

Although the recording circuit 106 of FIG. 2 illustrates five flip-flops, the scope of the present disclosure is not limited to it. In various other embodiments, the recording circuit 106 may include more or less than five flip-flops, without deviating from the scope of the present disclosure. Further, a count of the data bits in the configuration data CF is equal to a count of flip-flops in the recording circuit 106.

The scope of the present disclosure is not limited to the counter 208 being activated based on the intermediate data bit IDB. In an alternate embodiment, the counter 208 may be coupled to the test circuit 104, and may be configured to receive the scan enable signal SE from the test circuit 104. In such a scenario, the counter 208 may be activated when the scan enable signal SE is de-asserted.

Figure 3:
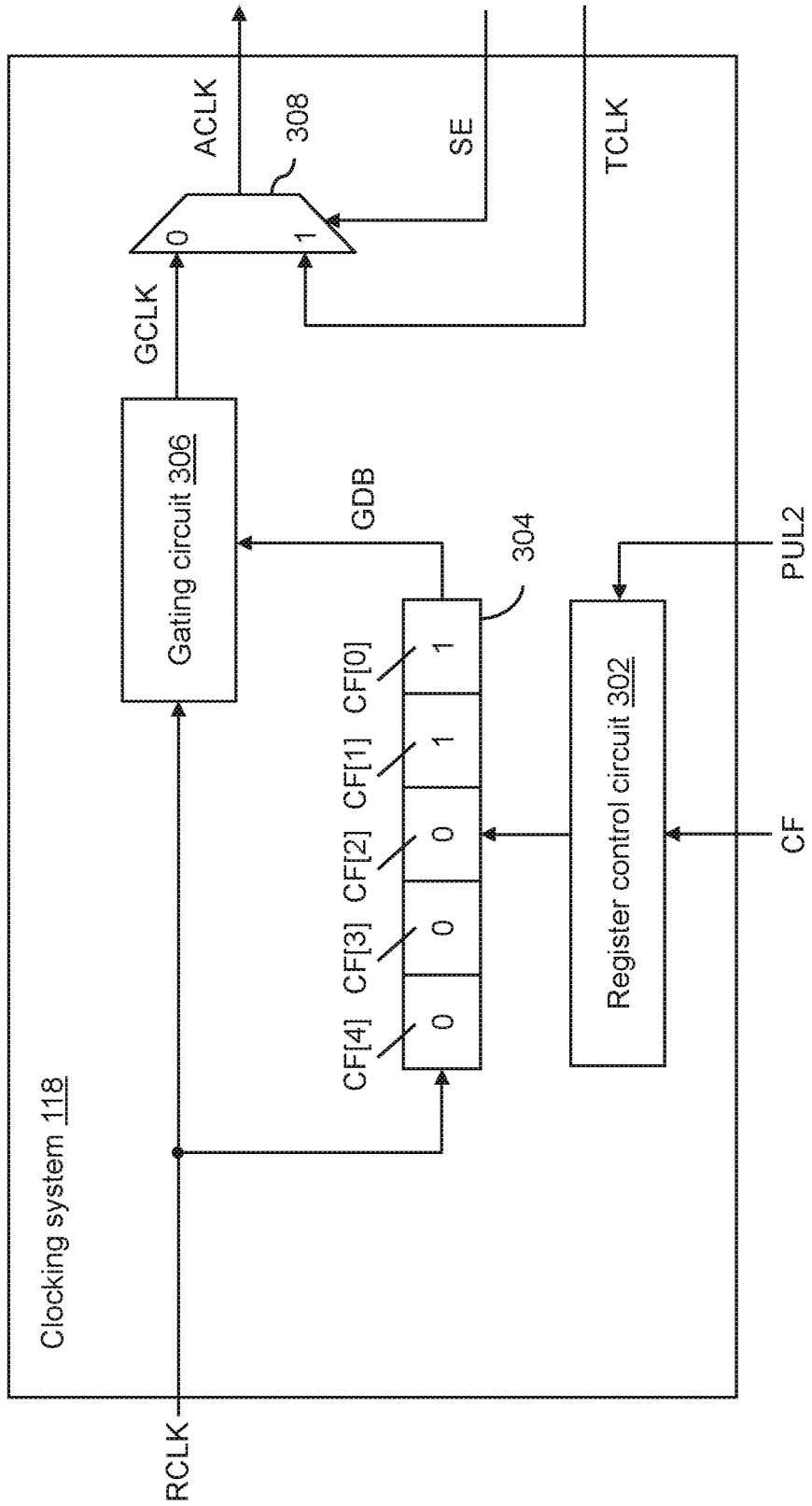
FIG. 3 illustrates a schematic circuit diagram of a clocking system of the IC in accordance with an embodiment of the present disclosure.

FIG. 3 illustrates a schematic block diagram of the clocking system 118 in accordance with an embodiment of the present disclosure. The clocking system 118 generates the at-speed clock signal ACLK by extracting clock pulses from the reference clock signal RCLK based on the configuration data CF. To execute the aforementioned operation, the clocking system 118 may include a register control circuit 302, a shift register 304, a gating circuit 306, and a multiplexer 308.

The register control circuit 302 may be coupled to the recording circuit 106, the detection circuit 114, and the shift register 304. The register control circuit 302 may include suitable circuitry that may be configured to perform one or more operations. For example, the register control circuit 302 may be configured to receive the configuration data CF from the recording circuit 106 and the second pulse signal PUL2 from the detection circuit 114. The asserted state of the second pulse signal PUL2 may indicate to the register control circuit 302 that all clock pulses of the test clock signal TCLK during the capture phase are recorded by the recording circuit 106 (e.g., the configuration data CF can be loaded in the shift register 304). The asserted state of the second pulse signal PUL2 may further indicate that the change in the frequency of the reference clock signal RCLK is settled. Further, the register control circuit 302 may be configured to load the configuration data CF in the shift register 304 based on the asserted second pulse signal PUL2.

The shift register 304 may be coupled to the divider circuit 110, and may be configured to receive the reference clock signal RCLK from the divider circuit 110. The shift register 304 is synchronous with the reference clock signal RCLK such that for each cycle of the reference clock signal RCLK, a bit-shift operation is executed. The bit-shift operation may correspond to a right-shift operation or a left-shift operation. For the sake of brevity, the shift register 304 is shown to execute the right-shift operation in FIG. 3. After the configuration data CF is loaded in the shift register 304 during the capture phase, the plurality of data bits (e.g., the first through fifth data bits CF [0]—CF [4]) of configuration data CF is right-shifted in the shift register 304 based on the reference clock signal RCLK such that for each cycle of the reference clock signal RCLK, the shift register 304 may be further configured to output a data bit of the configuration data CF as a gating data bit GDB. For example, if the configuration data CF corresponds to '00011', the shift register 304 may output '1', '1', '0', '0', and '0' as the gating data bit GDB for five consecutive cycles of the reference clock signal RCLK. The gating data bit GDB enables the extraction of the clock pulses from the reference clock signal RCLK.

The gating circuit 306 may be coupled to the divider circuit 110 and the shift register 304. The gating circuit 306 may include suitable circuitry that may be configured to perform one or more operations. For example, the gating circuit 306 may be configured to receive the reference clock signal RCLK and the gating data bit GDB from the divider circuit 110 and the shift register 304, respectively. The gating circuit 306 may be further configured to generate a gated clock signal GCLK based on the reference clock signal RCLK and the gating data bit GDB. The gated clock signal GCLK may be de-asserted based on a de-assertion of the gating data bit GDB, and the gated clock signal GCLK is the same as the reference clock signal RCLK based on an assertion of the gating data bit GDB. During the capture phase, the gating data bit GDB is asserted for a plurality of cycles of the reference clock signal RCLK, where the count of the plurality of cycles is equal to the number of clock pulses of the test clock signal TCLK. In such cases, the gated clock signal GCLK includes the plurality of clock pulses that corresponds to the plurality of cycles of the reference clock signal RCLK. For example, when the gating data bit GDB is asserted for three cycles of the reference clock signal RCLK, the gated clock signal GCLK may include the corresponding three cycles. In other words, the gating circuit 306 extracts three clock pulses from the reference clock signal RCLK and outputs the extracted clock pulses in the form of the gated clock signal GCLK.

The multiplexer 308 may be coupled to the gating circuit 306, the test circuit 104, and the clock management circuit 120. The multiplexer 308 may include first and second input terminals, a select terminal, and an output terminal. The first and second input terminals of the multiplexer 308 may be coupled to the gating circuit 306 and the test circuit 104, and may be configured to receive the gated clock signal GCLK and the test clock signal TCLK from the gating circuit 306 and the test circuit 104, respectively. The select terminal of the multiplexer 308 may be coupled to the test circuit 104, and may be configured to receive the scan enable signal SE from the test circuit 104. The multiplexer 308 may be further configured to generate, at the output terminal thereof, the at-speed clock signal ACLK based on the gated clock signal GCLK, the test clock signal TCLK, and the scan enable signal SE. Thus, based on the de-assertion of the scan enable signal SE, the at-speed clock signal ACLK is same as the gated clock signal GCLK, and based on the assertion of the scan enable signal SE, the at-speed clock signal ACLK is same as the test clock signal TCLK. In other words, during the capture phase, the at-speed clock signal ACLK is same as the gated clock signal GCLK, and during the shift phase, the at-speed clock signal ACLK is same as the test clock signal TCLK. Further, the multiplexer 308 may be configured to provide the at-speed clock signal ACLK to the clock management circuit 120.

The scope of the present disclosure is not limited to the shift register 304 including five bits. In various other embodiments, the clocking system 118 may include a shift register having less than or more than five bits, without deviating from the scope of the present disclosure.

During the functional mode, the shift register 304 may be loaded with all ones. In such cases, the gated clock signal GCLK may be same as the reference clock signal RCLK.

Figure 4:
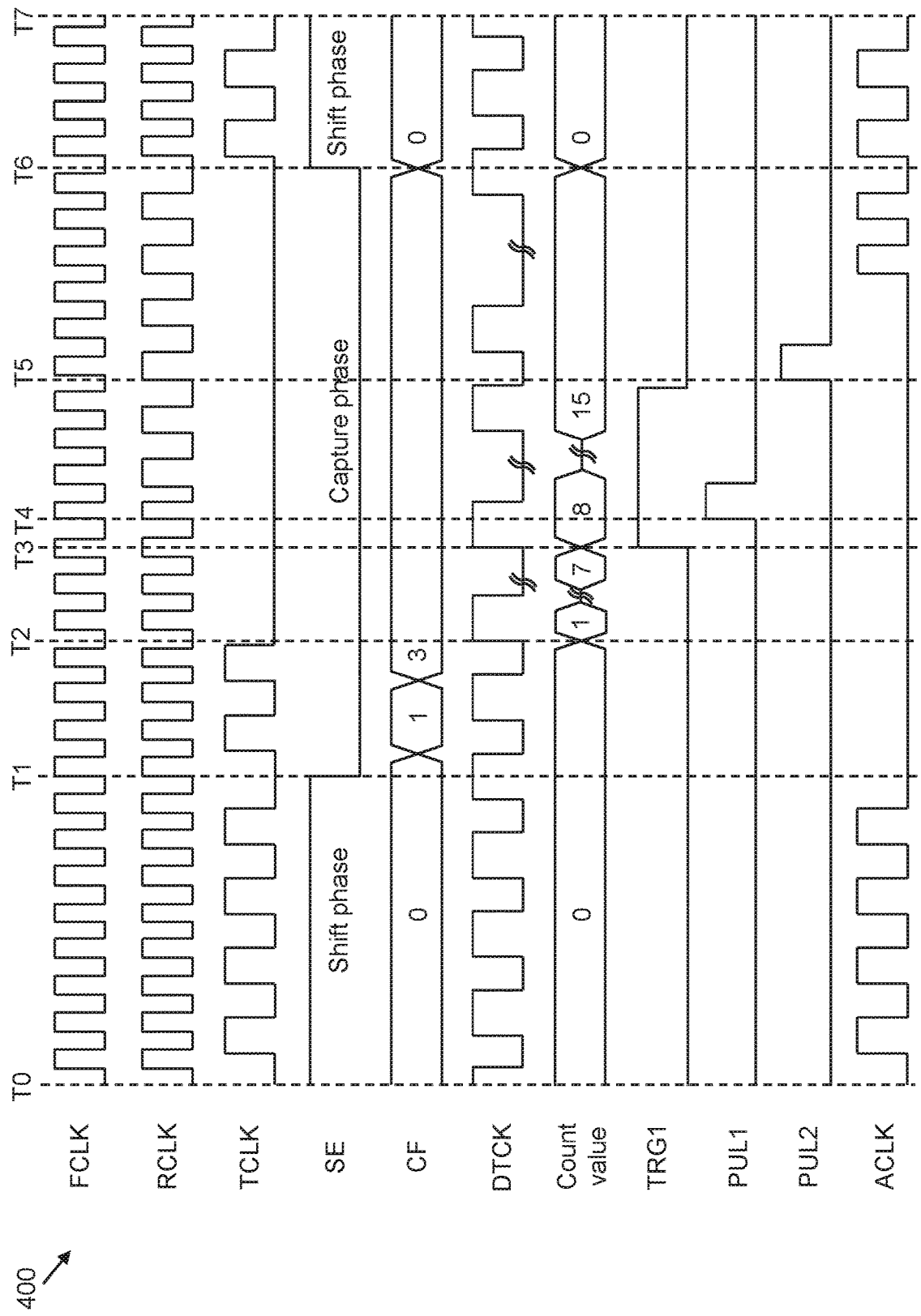
FIG. 4 represents a timing diagram that illustrates an operation of the IC in accordance with an embodiment of the present disclosure.

FIG. 4 represents a timing diagram 400 that illustrates an operation of the IC 102 in accordance with an embodiment of the present disclosure.

During a time period T0-T1, the scan enable signal SE is asserted. In other words, the time period T0-T1 corresponds to the shift phase. Thus, the reference clock signal RCLK has the same frequency as the fixed clock signal FCLK. Further, the recording circuit 106 is in the reset state. Hence, the configuration data CF and the count value have the value '0'. Consequently, the first trigger signal TRG1, the first pulse signal PUL1, and the second pulse signal PUL2 are de-asserted. During the shift phase, the gating data bit GDB does not control the generation of the at-speed clock signal ACLK. Thus, the at-speed clock signal ACLK is same as the test clock signal TCLK during the time period T0-T1.

At time instance T1, the scan enable signal SE transitions from the asserted state to the de-asserted state, thereby activating the capture phase. In the capture phase, the number of clock pulses of the test clock signal TCLK is recorded and the same number of clock pulses are replayed at the desired operating frequency in the IC 102 for the at-speed testing of the IC 102.

During a time period T1-T2, the test clock signal TCLK includes two clock pulses. With the receipt of each clock pulse, the configuration data CF is updated in a sequential manner from the LSB to MSB. Thus, for two clock pulses, the first and second data bits CF [0] and CF [1] are asserted and the third through fifth data bits CF [2]—CF [4] are de-asserted. This is indicated in the timing diagram 400 by way of increment of the configuration data CF from value '0' to value '1' (e.g., 4'b0001) when the first clock pulse is received, and from value '1' to value '3' (e.g., 4'b0011) when the second clock pulse is received. During the time period T1-T2, the reference clock signal RCLK and the fixed clock signal FCLK continue to have the same frequency, and the first trigger signal TRG1, the first pulse signal PUL1, the second pulse signal PUL2, and the at-speed clock signal ACLK are de-asserted.

At time instance T2, the count value starts incrementing (e.g., the counter 208 is activated). The activation of the counter 208 at the time instance T2 is controlled based on the assertion of the second data bit CF [1] (e.g., the predefined data bit CF [1]) of the configuration data CF, towards the end of the time period T1-T2.

During a time period T2-T3, the count value increments in synchronization with the detection clock signal DTCK. For example, the count value is updated from value '1' to value '7' during the time period T2-T3. During the time period T2-T3, the reference clock signal RCLK and the fixed clock signal FCLK continue to have the same frequency, and the first trigger signal TRG1, the first pulse signal PUL1, the second pulse signal PUL2, and the at-speed clock signal ACLK remain de-asserted.

At time instance T3, the first trigger signal TRG1 transitions from the de-asserted state to the asserted state. The first trigger signal TRG1 transitions as the count value reaches the first predetermined value (e.g., value '7') towards the end of the time period T2-T3. The transition of the first trigger signal TRG1 at the time instance T3 results in the transition of the first pulse signal PUL1 (e.g., generation of a pulse) from the de-asserted state to the asserted state at time instance T4 (e.g., as the first pulse signal PUL1 is generated in synchronization with the reference clock signal RCLK). The assertion of the first pulse signal PUL1 may cause the frequency of the reference clock signal RCLK to be adjusted. Thus, during the time period T3-T4, the reference clock signal RCLK and the fixed clock signal FCLK may have the same frequency, whereas, after the time instance T4, the frequency of the reference clock signal RCLK is altered to be different from that of the fixed clock signal FCLK (e.g., and to be equal to the frequency of the first clock domain that is to be tested). As a result, during a time period T4-T5, the reference clock signal RCLK and the fixed clock signal FCLK may have different frequencies. Further, during the time period T4-T5, the count value continues to increment and is updated from the value '8' to the value '15'. When the count value reaches the second predetermined value (e.g., the value '15'), the first trigger signal TRG1 transitions from the asserted state to the de-asserted state. Further, during the time period T3-T5, the second pulse signal PUL2 and the at-speed clock signal ACLK remain de-asserted.

At time instance T5, the second pulse signal PUL2 transitions from the de-asserted state to the asserted state (e.g., a pulse is generated), as the second pulse signal PUL2 is generated in synchronization with the reference clock signal RCLK.

During a time period T5-T6, the assertion of the second pulse signal PUL2 may enable the generation of the at-speed clock signal ACLK. For example, based on the assertion of the second pulse signal PUL2, the configuration data CF (e.g., having two asserted data bits) is loaded in the shift register 304, and the output of the shift register 304 (e.g., the gating data bit GDB) is utilized for extracting clock pulses from the reference clock signal RCLK to generate the at-speed clock signal ACLK. Thus, the at-speed clock signal ACLK has the same number of clock pulses as the test clock signal TCLK during the capture phase. Further, since these clock pulses are extracted from the reference clock signal RCLK which is adjusted to the desired operating frequency, the frequency of the at-speed clock signal ACLK is equal to the frequency of the first clock domain that is to be tested (e.g., the frequency at which the IC 102 is to be tested).

At time instance T6, the scan enable signal SE transitions from the de-asserted state to the asserted state, thereby activating another shift phase and resetting the recording circuit 106 and the counter 208 (e.g., the configuration data CF and the count value are reset to the value '0'). Thus, during a time period T6-T7, the scan enable signal SE is asserted and the at-speed clock signal ACLK is same as the test clock signal TCLK. During the time period T6-T7, the response captured in the scan chains may be shifted out and a new test pattern may be shifted in the scan chains of the first and second functional circuits 130 and 132 in synchronization with the test clock signal TCLK. Further, during the time period T6-T7, the frequency of the reference clock signal RCLK becomes the same as that of the fixed clock signal FCLK and continues to remain the same until another capture phase begins.

Figure 5A:
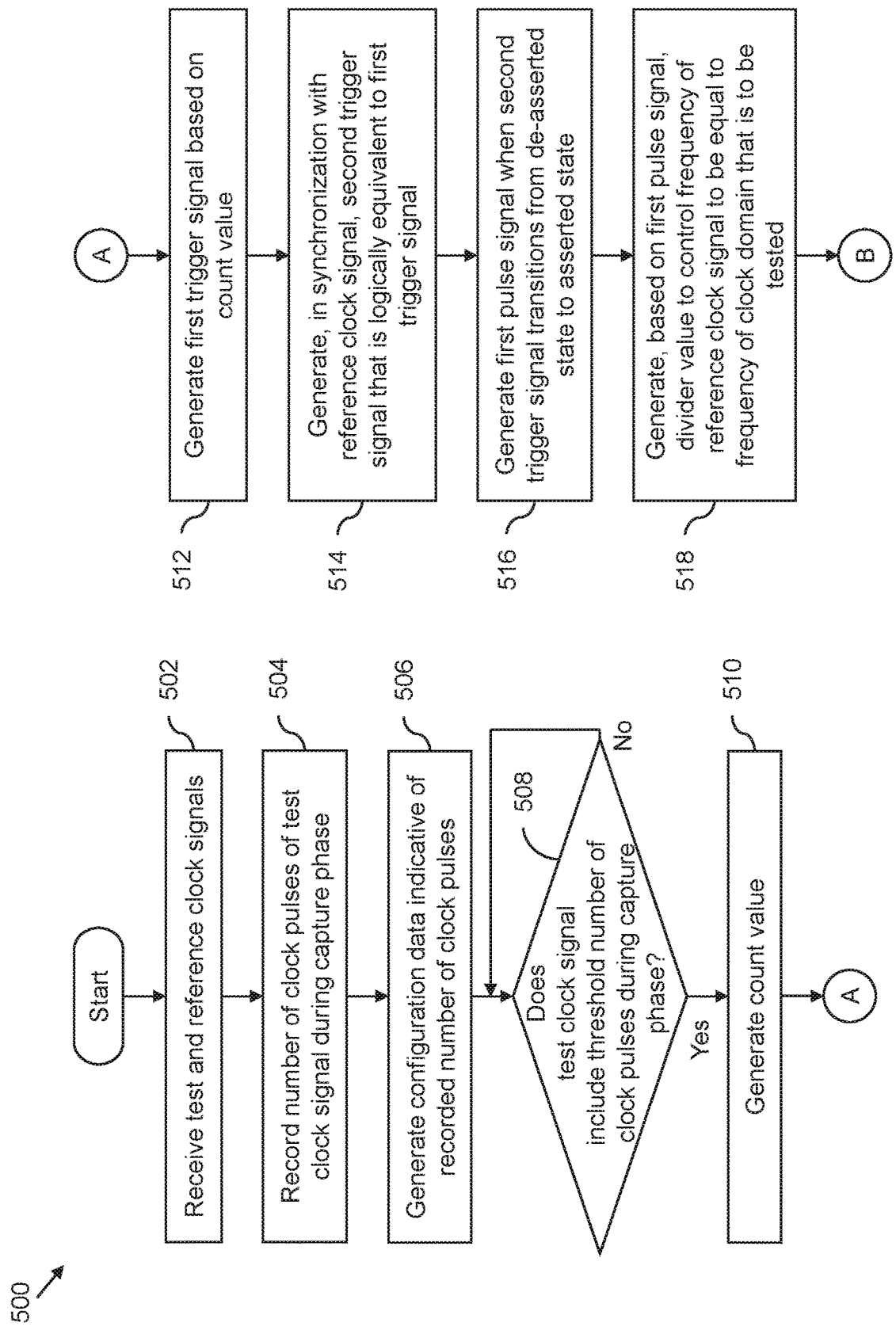
FIGS. 5A-5C, collectively, represents a flowchart that illustrates a method for controlling at-speed testing of the IC in accordance with an embodiment of the present disclosure.
Figure 5B:
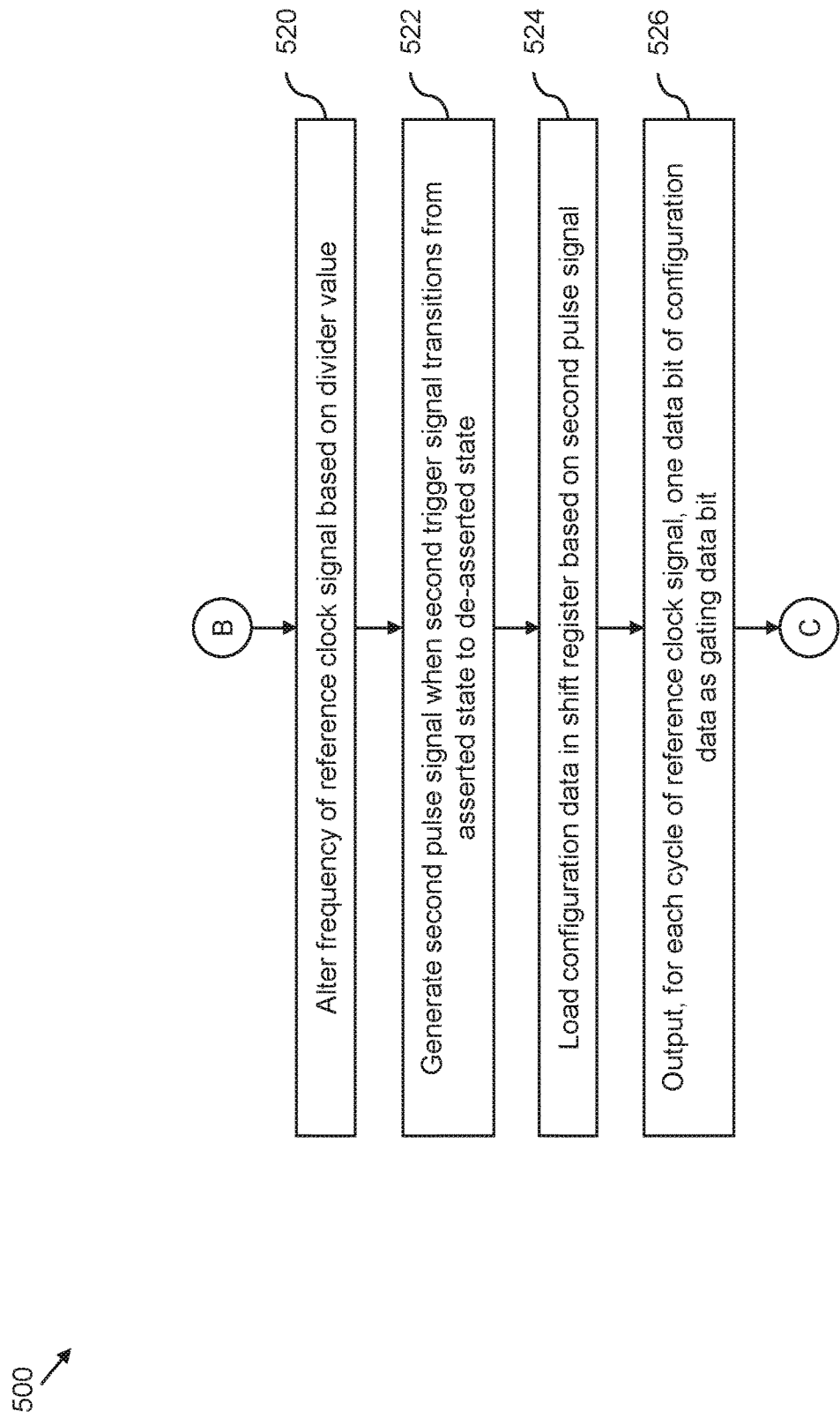
Figure 5C:
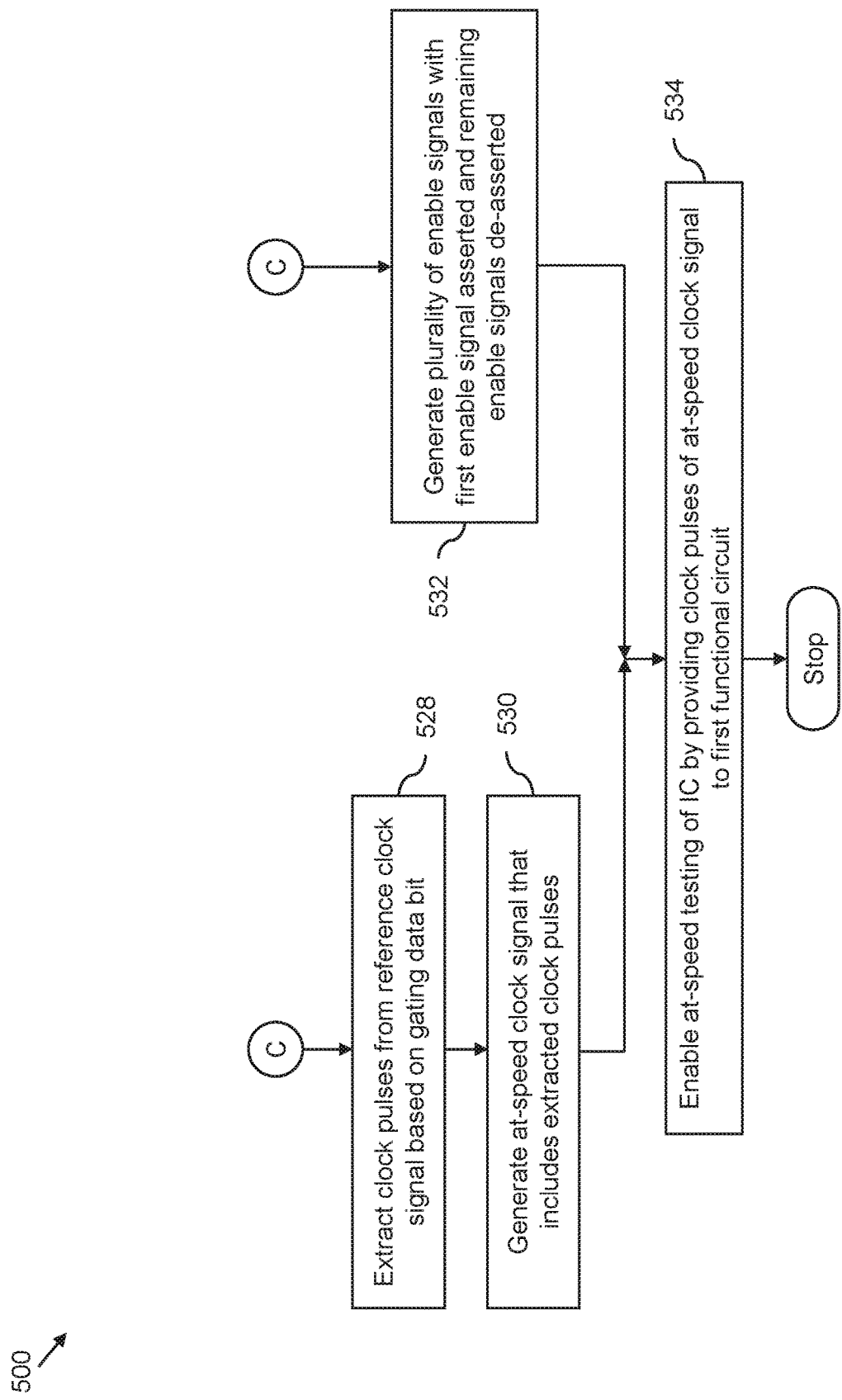

FIGS. 5A-5C, collectively, represents a flowchart 500 that illustrates a method for controlling the at-speed testing of the IC 102 in accordance with an embodiment of the present disclosure.

Referring to FIG. 5A, at step 502, the test and reference clock signals TCLK and RCLK may be received. For example, the clocking system 118 may receive both the test and reference clock signals TCLK and RCLK, the recording circuit 106 may receive the test clock signal TCLK, and the detection circuit 114 may receive the reference clock signal RCLK. Further, although not shown in FIG. 5A, the recording circuit 106 and the clocking system 118 may receive the scan enable signal SE. At step 504, the recording circuit 106 may record the number of clock pulses of the test clock signal TCLK during the capture phase. At step 506, the recording circuit 106 may generate the configuration data CF indicative of the number of clock pulses. The configuration data CF includes the first through fifth data bits CF [0]—CF [4], with the number of asserted data bits indicative of the recorded number of clock pulses of the test clock signal TCLK during the capture phase.

At step 508, it is determined whether the test clock signal TCLK includes a threshold number of clock pulses during the capture phase. The first synchronizer 206 may perform this test by checking whether the second data bit CF [1] is asserted. If at step 508, it is determined that the test clock signal TCLK does not include the threshold number of clock pulses (e.g., the second data bit CF [1] is de-asserted), step 508 is repeated. Conversely, if at step 508, it is determined that the test clock signal TCLK includes the threshold number of clock pulses (e.g., the second data bit CF [1] is asserted), step 510 is performed.

At step 510, the counter 208 is activated and the activated counter 208 may generate the count value. The count value is incremented in synchronization with the detection clock signal DTCK. At step 512, the counter 208 may generate the first trigger signal TRG1 based on the count value. The first trigger signal TRG1 is generated in a de-asserted state and transitions from the de-asserted state to the asserted state when the count value reaches the first predetermined value. The first trigger signal TRG1 may further transition from the asserted state to the de-asserted state when the count value reaches the second predetermined value.

At step 514, the second synchronizer 210 may generate, in synchronization with the reference clock signal RCLK, the second trigger signal TRG2 that is logically equivalent to the first trigger signal TRG1. At step 516, the positive edge detector 212 may generate the first pulse signal PUL1 when the second trigger signal TRG2 transitions from the de-asserted state to the asserted state (e.g., when the count value reaches the first predetermined value). At step 518, the domain controller 116 may generate, based on the first pulse signal PUL1, the divider value DV to control the frequency of the reference clock signal RCLK to be equal to the frequency of a clock domain (e.g., the first clock domain) that is to be tested.

Referring to FIG. 5B, at step 520, the divider circuit 110 may alter the frequency of the reference clock signal RCLK based on the divider value DV. The frequency of the reference clock signal RCLK is equal to the division of the frequency of the fixed clock signal FCLK by the divider value DV. Thus, on the receipt of the first pulse signal PUL1, the frequency of the reference clock signal RCLK is adjusted to be equal to the frequency of the first clock domain. At step 522, the negative edge detector 214 may generate the second pulse signal PUL2 when the second trigger signal TRG2 transitions from the asserted state to the de-asserted state. At step 524, the register control circuit 302 may load the configuration data CF in the shift register 304 based on the second pulse signal PUL2. At step 526, the shift register 304 may output, for each cycle of reference clock signal RCLK, one data bit of the configuration data CF as the gating data bit GDB.

Referring to FIG. 5C, at step 528, the gating circuit 306 may extract clock pulses from the reference clock signal RCLK based on the gating data bit GDB. At step 530, the multiplexer 308 may generate the at-speed clock signal ACLK that includes the extracted clock pulses. The at-speed clock signal ACLK may be generated based on the gated clock signal GCLK, the test clock signal TCLK, and the scan enable signal SE. The at-speed clock signal ACLK is the same as the gated clock signal GCLK during the capture phase. Thus, the at-speed clock signal ACLK has the same number of clock pulses as the test clock signal TCLK during the capture phase. Further, since these clock pulses are extracted from the reference clock signal RCLK which is adjusted to the desired operating frequency, the frequency of the at-speed clock signal ACLK is equal to the frequency of the first clock domain that is to be tested. At step 532, the plurality of clock gate controllers may generate the plurality of enable signals (e.g., the first and second enable signals EN1 and EN2) with one enable signal (e.g., the first enable signal EN1) asserted and remaining enable signals de-asserted. The first enable signal EN1 activates the first clock gate 126. The first enable signal EN1 is asserted as the first clock domain is to be tested. Step 532 may be performed parallelly with steps 528 and 530.

At step 534, the activated first clock gate 126 may enable the at-speed testing of the IC 102 by providing the clock pulses of the at-speed clock signal ACLK to the first functional circuit 130.

Thus, in the present disclosure, during the capture phase, the recording circuit 106 records the clock pulses generated by the test circuit 104, and the clocking system 118 replays the recorded clock pulses at the desired operating frequency for enabling the at-speed testing of the IC 102. The capture phase operations are thus controlled by the test circuit 104. As a result, the test circuit 104 can generate test patterns requiring any number of clock pulses and generate the desired number of clock pulses during the capture phase which can be recorded and replayed at the desired operating frequency by the recording circuit 106 and the clocking system 118, respectively. In other words, the generation of the test patterns is not restricted by a fixed number of clock pulses during the capture phase. In contrast, at-speed testing of a conventional IC (e.g., an IC where the conventional technique of generating launch and capture pulses is implemented) requires a fixed number of clock pulses during the capture phase and a test circuit is required to generate test patterns in accordance with the required number of clock pulses. Consequently, the fault coverage and the test quality of the at-speed testing of the IC 102 are significantly greater than that of the conventional IC. Further, as the test circuit 104 controls the clock generation during the capture phase, multi-load patterns or RAM sequential patterns (e.g., patterns that require a varying number of clock pulses during the capture phase) can be utilized for the at-speed testing, thereby further improving the test quality.

Additionally, in the present disclosure, dynamically generated configuration data CF is loaded in a shift register (e.g., the shift register 304), and the output bit of the shift register 304 is utilized for extracting clock pulses from the reference clock signal RCLK. This is contrary to the conventional IC, where a memory stores predefined configuration values for each possible operating frequency, and configuration values for loading in the shift registers are identified from the predefined configuration values stored in the memory. As a result, the size of the clocking system 118 is significantly less than that of a clocking system of the conventional IC. Consequently, the size of the IC 102 is significantly less than that of the conventional IC.

In the present disclosure, the term "assert" is used to mean placing a signal in an active state. For example, for an active-low signal, the signal is at a logic low state when asserted, and for an active-high signal, the signal is at a logic high state when asserted.

The detailed description of the appended drawings is intended as a description of the embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

In an embodiment of the present disclosure, the IC 102 is disclosed. The IC 102 may include the recording circuit 106 and the clocking system 118 that may be coupled to the recording circuit 106. The recording circuit 106 may be configured to receive the test clock signal TCLK and record the number of clock pulses of the test clock signal TCLK during the capture phase of the at-speed testing of the IC 102. The recording circuit 106 may be further configured to generate the configuration data CF indicative of the recorded number of clock pulses of the test clock signal TCLK. The clocking system 118 may be configured to receive the reference clock signal RCLK and the configuration data CF, and generate the at-speed clock signal ACLK. During the capture phase, the at-speed clock signal ACLK includes the plurality of clock pulses that are extracted from the reference clock signal RCLK based on the configuration data CF. The count of the plurality of clock pulses is equal to the recorded number of clock pulses of the test clock signal TCLK. The at-speed testing of the IC 102 is enabled based on the at-speed clock signal ACLK.

In another embodiment of the present disclosure, a method for controlling the at-speed testing of the IC 102 is disclosed. The method may include receiving the test clock signal TCLK and recording the number of clock pulses of the test clock signal TCLK during the capture phase of the at-speed testing of the IC 102, by the recording circuit 106. The method may further include generating the configuration data CF by the recording circuit 106. The configuration data CF is indicative of the recorded number of clock pulses of the test clock signal TCLK. The method may further include receiving the reference clock signal RCLK and the configuration data CF, and extracting, during the capture phase, the plurality of clock pulses from the reference clock signal RCLK based on the configuration data CF, by the clocking system 118. The method may further include generating the at-speed clock signal ACLK by the clocking system 118. The at-speed clock signal ACLK includes the extracted plurality of clock pulses. The count of the plurality of clock pulses is equal to the recorded number of clock pulses of the test clock signal TCLK. Further, the at-speed testing of the IC 102 is enabled based on the at-speed clock signal ACLK.

In some embodiments, the configuration data CF may include the plurality of data bits (e.g., the first through fifth data bits CF [0]—CF [4]). The number of asserted data bits of the configuration data CF is indicative of the recorded number of clock pulses of the test clock signal TCLK during the capture phase.

In some embodiments, the scan enable signal SE may be asserted during the shift phase of the at-speed testing and de-asserted during the capture phase.

In some embodiments, the recording circuit 106 may include the plurality of flip-flops 204a-204e that may be coupled in series, and may be configured to generate the configuration data CF. The first flip-flop 204a may include the input terminal that may be configured to receive the inverted scan enable signal ISE, the clock terminal that may be configured to receive the test clock signal TCLK, and the output terminal that may be configured to generate the first data bit CF [0] of the configuration data CF. The first data bit CF [0] is logically equivalent to the inverted scan enable signal ISE. Further, each remaining flip-flop (e.g., the second through fifth flip-flops 204b-204e) may include the input terminal that may be coupled to the output terminal of a previous flip-flop of the plurality of flip-flops 204a-204e, the clock terminal that may be configured to receive the test clock signal TCLK, and the output terminal that may be configured to generate the corresponding data bit of the configuration data CF.

In some embodiments, each flip-flop of the plurality of flip-flops 204a-204e may further include the reset terminal that may be configured to receive the scan enable signal SE. Based on the scan enable signal SE, each flip-flop may be in the reset state during the shift phase and may generate the corresponding data bit of the configuration data CF during the capture phase.

In some embodiments, the recording circuit 106 may further include the inverter 202 that may be coupled to the input terminal of the first flip-flop 204a. The inverter 202 may be configured to receive the scan enable signal SE, generate the inverted scan enable signal ISE, and provide the inverted scan enable signal ISE to the input terminal of the first flip-flop 204a.

In some embodiments, the IC 102 may further include the detection circuit 114 that may be coupled to the recording circuit 106 and the clocking system 118. The detection circuit 114 may be configured to receive the predefined data bit CF [1] of the configuration data CF and determine, based on the logic state of the predefined data bit CF [1], whether the test clock signal TCLK includes the threshold number of clock pulses during the capture phase. The frequency of the reference clock signal RCLK and the generation of the at-speed clock signal ACLK are controlled based on the determination that the test clock signal TCLK includes the threshold number of clock pulses during the capture phase.

In some embodiments, the number of asserted data bits of the configuration data CF may be indicative of the recorded number of clock pulses of the test clock signal TCLK during the capture phase. The assertion of data bits may be executed in the sequential manner from the LSB to the MSB. The predefined data bit CF [1] corresponds to either the LSB or the data bit that is adjacent to the LSB. The detection circuit 114 may determine that the test clock signal TCLK includes the threshold number of clock pulses during the capture phase based on the asserted state of the predefined data bit CF [1].

In some embodiments, the IC 102 may further include the domain controller 116 that may be coupled to the detection circuit 114. The domain controller 116 may be configured to identify the first clock domain, of the IC 102, that is to be tested during the capture phase. Further, the domain controller 116 may be configured to receive the first pulse signal PUL1 from the detection circuit 114 during the capture phase. The detection circuit 114 may be configured to generate the first pulse signal PUL1 on the lapse of the first predetermined time duration after determining that the test clock signal TCLK includes the threshold number of clock pulses during the capture phase. The domain controller 116 may be further configured to generate, based on the first pulse signal PUL1, the divider value DV to control the frequency of the reference clock signal RCLK. The frequency of the reference clock signal RCLK is adjusted to be equal to the frequency of the first clock domain based on the divider value DV.

In some embodiments, the IC 102 may further include the first clock generator 108 and the divider circuit 110 that may be coupled to the first clock generator 108 and the domain controller 116. The first clock generator 108 may be configured to generate the fixed clock signal FCLK having a fixed frequency. The divider circuit 110 may be configured to receive the fixed clock signal FCLK and the divider value DV from the first clock generator 108 and the domain controller 116, respectively, and generate the reference clock signal RCLK based on the fixed clock signal FCLK and the divider value DV. The frequency of the reference clock signal RCLK is equal to the division of the frequency of the fixed clock signal FCLK by the divider value DV.

In some embodiments, the detection circuit 114 may be further configured to detect whether all clock pulses of the test clock signal TCLK during the capture phase are recorded by the recording circuit 106 and/or the change in the frequency of the reference clock signal RCLK is settled based on the determination that the test clock signal TCLK includes the threshold number of clock pulses during the capture phase. The detection circuit 114 may be further configured to generate the second pulse signal PUL2 indicating that all clock pulses of the test clock signal TCLK are recorded and/or that the change in the frequency of the reference clock signal RCLK is settled. Further, the detection circuit 114 may be configured to provide the second pulse signal PUL2 to the clocking system 118. The clocking system 118 may generate the at-speed clock signal ACLK based on the second pulse signal PUL2.

In some embodiments, the detection circuit 114 may further include the counter 208. The counter 208 may be configured to receive the detection clock signal DTCK and generate the count value that is incremented in synchronization with the detection clock signal DTCK. The difference between the frequency of the detection clock signal DTCK and the frequency of the test clock signal TCLK is within a predefined range. The counter 208 is activated and generates the count value based on the asserted state of the predefined data bit CF [1] of the configuration data CF. The counter 208 may be further configured to generate the first trigger signal TRG1 based on the count value such that the first trigger signal TRG1 transitions from the de-asserted state to the asserted state when the count value reaches the first predetermined value and transitions from the asserted state to the de-asserted state when the count value reaches the second predetermined value.

In some embodiments, the detection circuit 114 may further include the first synchronizer 206 that may be coupled to the recording circuit 106 and the counter 208. The first synchronizer 206 may be configured to receive the detection clock signal DTCK and the predefined data bit CF [1] and generate, in synchronization with the detection clock signal DTCK, the intermediate data bit IDB that is logically equivalent to the predefined data bit CF [1]. The first synchronizer 206 may be further configured to provide the intermediate data bit IDB to the counter 208. The counter 208 may be activated based on the asserted state of the intermediate data bit IDB.

In some embodiments, the detection circuit 114 may further include the second synchronizer 210 that may be coupled to the counter 208. The second synchronizer 210 may be configured to receive the first trigger signal TRG1 and the reference clock signal RCLK, and generate, in synchronization with the reference clock signal RCLK, the second trigger signal TRG2 that is logically equivalent to the first trigger signal TRG1. The detection circuit 114 may further include the positive edge detector 212 that may be coupled to the second synchronizer 210. The positive edge detector 212 may be configured to generate the first pulse signal PUL1 based on the transition of the second trigger signal TRG2 from the de-asserted state to the asserted state. The frequency of the reference clock signal RCLK may be adjusted to be equal to the frequency of the first clock domain that is to be tested during the capture phase based on the first pulse signal PUL1. The detection circuit 114 may further include the negative edge detector 214 that may be coupled to the second synchronizer 210. The negative edge detector 214 may be configured to generate the second pulse signal PUL2 based on the transition of the second trigger signal TRG2 from the asserted state to the de-asserted state. The negative edge detector 214 may be further configured to provide the second pulse signal PUL2 to the clocking system 118. The clocking system 118 may generate the at-speed clock signal ACLK further based on the second pulse signal PUL2.

In some embodiments, the clocking system 118 may further include the shift register 304 and the register control circuit 302 that may be coupled to the shift register 304. The shift register 304 may be configured to receive the reference clock signal RCLK. The register control circuit 302 may be configured to receive the configuration data CF from the recording circuit 106 and load the configuration data CF in the shift register 304 based on the indication that all clock pulses of the test clock signal TCLK during the capture phase are recorded by the recording circuit 106 and/or the change in the frequency of the reference clock signal RCLK is settled. The configuration data CF may include the plurality of data bits (e.g., the first through fifth data bits CF [0]—CF [4]) that may be shifted in the shift register 304 based on the reference clock signal RCLK such that for each cycle of the reference clock signal RCLK, the shift register 304 is further configured to output a data bit of the configuration data CF as the gating data bit GDB. Further, the gating data bit GDB enables the extraction of the plurality of clock pulses from the reference clock signal RCLK.

In some embodiments, the clocking system 118 may further include the gating circuit 306 that may be coupled to the shift register 304, and the multiplexer 308 that may be coupled to the gating circuit 306. The gating circuit 306 may be configured to generate the gated clock signal GCLK based on the reference clock signal RCLK and the gating data bit GDB. The gated clock signal GCLK is de-asserted based on the de-assertion of the gating data bit GDB, and the gated clock signal GCLK is same as the reference clock signal RCLK based on the assertion of the gating data bit GDB. Further, during the capture phase, the gating data bit GDB is asserted for the plurality of cycles of the reference clock signal RCLK, and the gated clock signal GCLK includes the plurality of clock pulses that corresponds to the plurality of cycles of the reference clock signal RCLK. The multiplexer 308 may be configured to receive the gated clock signal GCLK, the test clock signal TCLK, and the scan enable signal SE, and generate the at-speed clock signal ACLK. The at-speed clock signal ACLK is the same as the gated clock signal GCLK based on the de-assertion of the scan enable signal SE. Further, the at-speed clock signal ACLK is same as the test clock signal TCLK based on the assertion of the scan enable signal SE.

In some embodiments, the plurality of clock pulses may include the launch pulse and one or more capture pulses.

In some embodiments, the IC 102 may further include the plurality of clock gate controllers (e.g., the first and second clock gate controllers 122 and 124) and the plurality of clock gates (e.g., the first and second clock gates 126 and 128) that may be coupled to the plurality of clock gate controllers. The plurality of clock gate controllers may be configured to generate the plurality of enable signals (e.g., the first and second enable signals EN1 and EN2) such that during the at-speed testing of the IC 102, one of the plurality of enable signals is asserted. The plurality of clock gates may be configured to receive the plurality of enable signals such that each clock gate of the plurality of clock gates may be activated based on the assertion of the corresponding enable signal. Further, during the capture phase, each of the plurality of clock gates may be configured to receive the at-speed clock signal ACLK.

In some embodiments, the IC 102 may further include the plurality of functional circuits (e.g., the first and second functional circuits 130 and 132) that may be coupled to the plurality of clock gates. During the at-speed testing of the IC 102, one clock gate (e.g., the first clock gate 126) of the plurality of clock gates is activated and remaining clock gates of the plurality of clock gates are deactivated, the activated clock gate may be configured to provide the plurality of clock pulses of the at-speed clock signal ACLK to a functional circuit (e.g., the first functional circuit 130) coupled thereto, and the functional circuit may be configured to execute one or more operations of the capture phase based on the plurality of clock pulses.

In some embodiments, the at-speed clock signal ACLK is utilized in conjunction with a test pattern to enable the at-speed testing of the IC 102. The test pattern corresponds to at least one of a group consisting of a multi-load pattern and a random-access-memory (RAM) sequential pattern.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

We claim:

1. An integrated circuit (IC), comprising:
    a recording circuit configured to during a capture phase (i) receive a test clock signal from a test circuit, (ii) record, by counting, a number of clock pulses of the test clock signal at a first frequency, the number used to generate an at-speed clock during the capture phase of an at-speed testing of the IC, and (iii) generate configuration data indicative of the recorded number of clock pulses of the test clock signal during the capture phase; and
    a clocking system that is coupled to the recording circuit, and configured to receive during the capture phase a reference clock signal and the configuration data, and generate the at-speed clock signal, wherein during the capture phase, the at-speed clock signal comprises a plurality of clock pulses at a second frequency that are extracted from the reference clock signal based on the configuration data, wherein a count of the plurality of clock pulses is equal to the recorded number of clock pulses of the test clock signal, and wherein the at-speed testing of the IC is enabled based on the at-speed clock signal;
    wherein a scan enable (SE) signal is provided to the clocking system and to an input of an inverter having an output coupled to an input terminal of a first flip flop of the recording circuit for recording by counting the number of clock pulses of the test clock signal, wherein the SE signal is further provided to a reset terminal of the first flip flop to reset the first flip flop during a shift phase of the at speed testing of the IC and not to reset the first flip flop during the capture phase of the at speed testing of the IC to enable the recording, and wherein the capture phase is indicated by the SE signal being de-asserted.

2. The IC of claim 1, wherein the configuration data comprises a plurality of data bits, and wherein a number of asserted data bits of the configuration data is indicative of the recorded number of clock pulses of the test clock signal during the capture phase.

3. The IC of claim 1,
    wherein the recording circuit comprises a plurality of flip-flops that is coupled in series, and configured to generate the configuration data,
    wherein the first flip-flop of the plurality of flip-flops comprises (i) the input terminal configured to receive an inverted version of the scan enable signal, (ii) a clock terminal configured to receive the test clock signal, and (iii) an output terminal configured to generate a first data bit of the configuration data,
    wherein the scan enable signal is asserted during the shift phase of the at-speed testing and de-asserted during the capture phase, and the first data bit of the configuration data is logically equivalent to the inverted version of the scan enable signal, and
    wherein each remaining flip-flop of the plurality of flip-flops comprises (i) an input terminal coupled to an output terminal of a previous flip-flop of the plurality of flip-flops, (ii) a clock terminal configured to receive the test clock signal, and (iii) an output terminal configured to generate a corresponding data bit of the configuration data.

4. The IC of claim 3, wherein each flip-flop of the plurality of flip-flops further comprises a reset terminal configured to receive the scan enable signal, and wherein based on the scan enable signal, each flip-flop of the plurality of flip-flops is in a reset state during the shift phase and generates the corresponding data bit of the configuration data during the capture phase.

5. The IC of claim 1, further comprising a detection circuit that is coupled to the recording circuit and the clocking system, and configured to:
    receive a predefined data bit of the configuration data; and
    determine, based on a logic state of the predefined data bit, whether the test clock signal comprises a threshold number of clock pulses during the capture phase, wherein at least one of a group consisting of (i) a frequency of the reference clock signal and (ii) the generation of the at-speed clock signal are controlled based on the determination that the test clock signal comprises the threshold number of clock pulses during the capture phase.

6. The IC of claim 5, wherein a number of asserted data bits of the configuration data is indicative of the recorded number of clock pulses of the test clock signal during the capture phase, wherein the assertion of data bits is executed in a sequential manner from a least significant bit to a most significant bit, wherein the predefined data bit corresponds to at least one of a group consisting of (i) the least significant bit and (ii) a data bit that is adjacent to the least significant bit, and wherein the detection circuit determines that the test clock signal comprises the threshold number of clock pulses during the capture phase based on an asserted state of the predefined data bit.

7. The IC of claim 5, further comprises a domain controller that is coupled to the detection circuit, and configured to:
    identify a first clock domain, of the IC, that is to be tested during the capture phase;
    receive a first pulse signal from the detection circuit, wherein the detection circuit is further configured to generate the first pulse signal on a lapse of a first predetermined time duration after determining that the test clock signal comprises the threshold number of clock pulses during the capture phase; and generate, based on the first pulse signal, a divider value to control the frequency of the reference clock signal, wherein based on the divider value, the frequency of the reference clock signal is adjusted to be equal to a frequency of the first clock domain.

8. The IC of claim 7, further comprising:

a first clock generator configured to generate a fixed clock signal having a fixed frequency; and a divider circuit that is coupled to the first clock generator and the domain controller, and configured to receive the fixed clock signal and the divider value from the first clock generator and the domain controller, respectively, and generate the reference clock signal based on the fixed clock signal and the divider value such that the frequency of the reference clock signal is equal to a division of the fixed frequency by the divider value.

9. The IC of claim 5, wherein the detection circuit is further configured to:

detect, based on the determination that the test clock signal comprises the threshold number of clock pulses during the capture phase, whether at least one of a group consisting of (i) all clock pulses of the test clock signal during the capture phase are recorded by the recording circuit and (ii) a change in the frequency of the reference clock signal is settled;

generate a second pulse signal indicating that at least one of a group consisting of (i) all clock pulses of the test clock signal during the capture phase are recorded and (ii) the change in the frequency of the reference clock signal is settled; and provide the second pulse signal to the clocking system, wherein the clocking system generates the at-speed clock signal further based on the second pulse signal.

10. The IC of claim 5, wherein the detection circuit comprises a counter that is configured to:

receive a detection clock signal, wherein a difference between a frequency of the detection clock signal and a frequency of the test clock signal is within a predefined range;

generate a count value that is incremented in synchronization with the detection clock signal, wherein the counter is activated and generates the count value based on an asserted state of the predefined data bit of the configuration data; and generate a first trigger signal based on the count value such that the first trigger signal transitions from a de-asserted state to the asserted state when the count value reaches a first predetermined value and transitions from the asserted state to the de-asserted state when the count value reaches a second predetermined value.

11. The IC of claim 10, wherein the detection circuit further comprises a first synchronizer that is coupled to the recording circuit and the counter, and configured to:

receive the detection clock signal and the predefined data bit of the configuration data;

generate, in synchronization with the detection clock signal, an intermediate data bit that is logically equivalent to the predefined data bit; and provide the intermediate data bit to the counter, wherein the counter is activated based on the asserted state of the intermediate data bit.

12. The IC of claim 10, wherein the detection circuit further comprises:

a second synchronizer that is coupled to the counter, and configured to receive the first trigger signal and the reference clock signal, and generate, in synchronization with the reference clock signal, a second trigger signal that is logically equivalent to the first trigger signal; and a positive edge detector that is configured to generate a first pulse signal based on a transition of the second trigger signal from the de-asserted state to the asserted state, wherein based on the first pulse signal, the frequency of the reference clock signal is adjusted to be equal to a frequency of a first clock domain that is to be tested during the capture phase.

13. The IC of claim 10, wherein the detection circuit further comprises:

a second synchronizer that is coupled to the counter, and configured to receive the first trigger signal and the reference clock signal, and generate, in synchronization with the reference clock signal, a second trigger signal that is logically equivalent to the first trigger signal; and a negative edge detector that is configured to generate a second pulse signal based on a transition of the second trigger signal from the asserted state to the de-asserted state, and provide the second pulse signal to the clocking system, wherein the clocking system generates the at-speed clock signal further based on the second pulse signal.

14. The IC of claim 1, wherein the clocking system comprises:

a shift register configured to receive the reference clock signal; and a register control circuit that is coupled to the shift register and the recording circuit, and configured to receive the configuration data from the recording circuit and load the configuration data in the shift register based on at least one of a group consisting of (i) all clock pulses of the test clock signal during the capture phase being recorded by the recording circuit and (ii) a change in a frequency of the reference clock signal being settled, wherein the configuration data comprises a plurality of data bits that is shifted in the shift register based on the reference clock signal such that for each cycle of the reference clock signal, the shift register is further configured to output a data bit of the configuration data as a gating data bit, and wherein the gating data bit enables the extraction of the plurality of clock pulses from the reference clock signal.

15. The IC of claim 14, wherein the clocking system further comprises:

a gating circuit that is coupled to the shift register, and configured to generate a gated clock signal based on the reference clock signal and the gating data bit, wherein the gated clock signal is de-asserted based on a de-assertion of the gating data bit, and the gated clock signal is same as the reference clock signal based on an assertion of the gating data bit, and wherein during the capture phase, the gating data bit is asserted for a plurality of cycles of the reference clock signal and the gated clock signal comprises the plurality of clock pulses that corresponds to the plurality of cycles of the reference clock signal; and a multiplexer that is coupled to the gating circuit, and configured to receive the gated clock signal, the test clock signal, and the scan enable signal, and generate the at-speed clock signal, wherein based on a de-assertion of the scan enable signal, the at-speed clock signal is same as the gated clock signal, and based on an assertion of the scan enable signal, the at-speed clock signal is same as the test clock signal, and wherein the scan enable signal is asserted during a shift phase of the at-speed testing and de-asserted during the capture phase.

16. The IC of claim 1, wherein the plurality of clock pulses comprises a launch pulse and one or more capture pulses.

17. The IC of claim 1, further comprising:
- a plurality of clock gate controllers configured to generate a plurality of enable signals such that during the capture phase of the at-speed testing of the IC, one of the plurality of enable signals is asserted;
- a plurality of clock gates that is coupled to the plurality of clock gate controllers, and configured to receive the plurality of enable signals, wherein each clock gate of the plurality of clock gates is activated based on an assertion of a corresponding enable signal, and wherein during the capture phase, each of the plurality of clock gates is further configured to receive the at-speed clock signal; and
- a plurality of functional circuits coupled to the plurality of clock gates, wherein during the capture phase of the at-speed testing of the IC, (i) one of the plurality of clock gates is activated and remaining clock gates of the plurality of clock gates are deactivated, (ii) the activated clock gate is configured to provide the plurality of clock pulses of the at-speed clock signal to a functional circuit, of the plurality of functional circuits, coupled thereto, and (iii) the functional circuit is configured to execute one or more operations of the capture phase based on the plurality of clock pulses.

18. The IC of claim 1, wherein the at-speed clock signal is utilized in conjunction with a test pattern to enable the at-speed testing of the IC, and wherein the test pattern corresponds to at least one of a group consisting of a multi-load pattern and a random-access-memory (RAM) sequential pattern.

19. A method for controlling an at-speed testing of an integrated circuit (IC), the method comprising:
- receiving, by a recording circuit of the IC during the capture phase, a test clock signal from a test circuit;
- recording, by the recording circuit, a number of clock pulses of the test clock signal at a first frequency, the number used to generate an at-speed clock during the capture phase of the at-speed testing of the IC, the recording comprising counting the number of clock pulses;
- generating, by the recording circuit during the capture phase, configuration data indicative of the recorded number of clock pulses of the test clock signal;
- receiving, by a clocking system of the IC during the capture phase, a reference clock signal and the configuration data;
- extracting, by the clocking system during the capture phase, a plurality of clock pulses at a second frequency from the reference clock signal based on the configuration data; and
- generating, by the clocking system during the capture phase, the at-speed clock signal that comprises the extracted plurality of clock pulses, wherein a count of the plurality of clock pulses is equal to the recorded number of clock pulses of the test clock signal, and wherein the at-speed testing of the IC is enabled based on the at-speed clock signal;
- wherein a scan enable (SE) signal is provided to the clocking system and to an input of an inverter having an output coupled to an input terminal of a first flip flop of the recording circuit for recording by counting the number of clock pulses of the test clock signal, wherein the SE signal is further provided to a reset terminal of the first flip flop to reset the first flip flop during a shift phase and not to reset the first flip flop during the capture phase of the at speed testing of the IC to enable the recording, and wherein the capture phase is indicated by the SE signal being de-asserted.

* * * * *